US007240842B2

(12) United States Patent
Hara et al.

(10) Patent No.: US 7,240,842 B2
(45) Date of Patent: Jul. 10, 2007

(54) OPTICAL INFORMATION READING APPARATUS AND OPTICAL INFORMATION READING METHOD

(75) Inventors: Masahiro Hara, Nagoya (JP); Motoaki Watabe, Aichi-ken (JP)

(73) Assignee: Denso Wave Incorporated, Tokyo (JP)

( * ) Notice: Subject to any disclaimer, the term of this patent is extended or adjusted under 35 U.S.C. 154(b) by 417 days.

(21) Appl. No.: 10/874,373

(22) Filed: Jun. 24, 2004

(65) Prior Publication Data
US 2004/0262393 A1 Dec. 30, 2004

(30) Foreign Application Priority Data
Jun. 27, 2003 (JP) ............................. 2003-184801
Sep. 9, 2003 (JP) ............................. 2003-316951

(51) Int. Cl.
*G06K 7/10* (2006.01)
(52) U.S. Cl. .............. 235/462.2; 235/454; 235/462.01; 235/462.41
(58) Field of Classification Search ............................... 235/262.01–462.49
See application file for complete search history.

(56) References Cited
U.S. PATENT DOCUMENTS

| 4,760,248 A | * | 7/1988 | Swartz et al. ........... 235/472.01 |
| 5,528,022 A | | 6/1996 | Nakazawa |
| 5,612,531 A | | 3/1997 | Barkan |
| 6,637,658 B2 | | 10/2003 | Barber et al. |
| 6,935,566 B1 | * | 8/2005 | Mulla et al. ........... 235/472.01 |
| 2001/0001473 A1 | * | 5/2001 | Tsi et al. ............... 235/472.01 |
| 2002/0185536 A1 | | 12/2002 | Tsunobuchi et al. |
| 2003/0168512 A1 | | 9/2003 | Longacre, Jr. et al. |

FOREIGN PATENT DOCUMENTS

| JP | 10-198754 | 7/1998 |
| WO | WO 02/063543 A2 | 8/2002 |

OTHER PUBLICATIONS

Communication from European Patent Office dated Aug. 10, 2005.

* cited by examiner

*Primary Examiner*—Daniel A. Hess
(74) *Attorney, Agent, or Firm*—Posz Law Group, PLC

(57) ABSTRACT

A control circuit performs capturing of pixel signals along each scanning line when a high-speed capturing mode is selected, switches the capturing mode to a partial capturing mode when it is assumed based on the captured pixel signals that an information code is present in one image region, sets a capturing objective area at a predetermined central region to capture pixel signals in this capturing objective area and perform a decoding operation.

42 Claims, 16 Drawing Sheets

OPTICAL INFORMATION READING APPARATUS AND OPTICAL INFORMATION READING METHOD

BACKGROUND OF THE INVENTION

The present invention relates to an optical information reading apparatus having a function of optically reading an information code, such as one-dimensional code and a two-dimensional code, and also relates to its reading method.

The optical information reading apparatus units are recently used as an automatic information inputting and decoding apparatus in a wide variety of systems such as POS systems, OA systems and FA systems. One example of this kind of information code reading apparatus is a code reading apparatus disclosed in the Japanese Patent Application Laid-open No. 10-198754 (1998) applied for by the same applicant as that of this application.

This applicant, as disclosed in this patent document, uses an optical sensor, for example, having the resolution of 640 pixels×480 pixels (=307200 pixels) in total to pick up an image and decodes an information code contained in the picked-up image. According to this prior art, the time required for a bar code reading operation can be shortened.

In the field of optical information reading apparatuses, the requirement for high resolution is recently increasing to improve their reading performance. Accordingly, compared with a conventional type, the total pixel number of a new optical sensor used for picking up one image will need to be increased to a higher level (e.g. 802 pixels×602 pixels, 1077 pixels in lateral direction×788 pixels in vertical direction, approximately 400,000 pixels to 800,000 pixels or more). Accordingly, it will take a long time for accomplishing a reading operation and a decoding operation even if a conventional arrangement such as the one disclosed in the above prior art document is employed. When the reading and decoding time is long, a response time required for responding to a reading instruction will become long when a user issues such a reading instruction. The users will be dissatisfactory. Such a problem will also arise in a reading apparatus used for reading a bar code or other one-dimensional code. According to an arrangement of the present invention described in this application, it is possible to shorten the time required for reading and decoding operations even if an employed optical sensor has the resolution of 640 pixels×480 pixels (307200 pixels) in total.

SUMMARY OF THE INVENTION

In view of the above-described problems, the present invention has an object to provide an optical information reading apparatus and a related reading method, which enables users to shorten the time required for a reading operation even when an optical sensor having an increased number of pixels is employed to improve the reading performance compared with a conventional sensor. Thus, the present invention can assure improved comfort for the users in handling the optical information reading apparatus.

In order to accomplish the above and other related objects, the present invention provides an optical information reading apparatus including an optical sensor for picking up an image and reading means for optically reading an information code contained in pixel signals of an image region that is picked up by the optical sensor. According to the optical information reading apparatus of the present invention, switching means is provided for selecting one of a plurality of capturing modes in accordance with predetermined conditions being set in a reading apparatus unit. The capturing modes of the present invention include at least an ordinary capturing mode and a reduced-number capturing mode being registered beforehand in the reading apparatus unit. The ordinary capturing mode is for capturing all of pixel signals contained in one image region being imaged by the optical sensor. The reduced-number capturing mode is for capturing a reduced number of pixel signals in the one image region compared with the pixel signals captured when the ordinary capturing mode is selected. Furthermore, capturing means is provided for capturing the pixel signals in the one image region being imaged by the optical sensor according to the capturing mode being selected by the switching means.

Accordingly, even when an employed optical sensor has a relatively large number of pixels in total to improve the reading performance, this invention makes it possible to change the mode to the reduced-number capturing mode according to which the capturing means captures a reduced number of pixel signals in one image region being imaged by the optical sensor. Thus, the time required for a reading operation can be shortened. It is needless to say that this invention is applicable to an optical sensor having 640 pixels×480 pixels in total.

According to a preferable embodiment of the present invention, in addition to the above-described characteristic features of the present invention, the switching means can select one of capturing modes in accordance with a type of an information code being set beforehand in the reading apparatus unit. Therefore, this arrangement enables a user to arbitrarily change the number of pixel signals to be captured in one image region with reference to the type of the information code. Thus, general-purpose properties of the information reading apparatus can be improved.

In general, the information code being widely used consists of bright and dark points.

Therefore, according to a preferable embodiment of the present invention, in addition to the above-described characteristic features of the present invention, the reading means performs an optical reading operation when a minimum value of dark point pixels contained in pixel signals of one image region captured by the capturing means is larger than a predetermined value under a condition that the switching means selects the reduced-number capturing mode. This arrangement can judge the presence of an information code in one image region when the reduced-number capturing mode is selected and also can reduce the time required for the reading and decoding operations.

According to a preferable embodiment of the present invention, in addition to the above-described characteristic features of the present invention, the capturing means preliminarily captures pixel signals of one image region for setting reading conditions of the information code under a condition that the switching means selects the reduced-number capturing mode. This arrangement is effective in reducing the time required for setting the reading conditions of the information code.

Furthermore, according to a preferable embodiment of the invention, in addition to the above-described characteristic features of the present invention, the reduced-number capturing mode includes a high-speed capturing mode for capturing pixel signals of one image region being imaged by the optical sensor by thinning some pixel signals out every predetermined number of scanning lines. Thus, when the switching means selects the high-speed capturing mode, it is possible to capture a reduced number of pixel signals by performing the thinning-out operation every predetermined scanning lines and accordingly it becomes possible to shorten the time required for reading and decoding operations.

According to a preferable embodiment of the present invention, in addition to the above-described characteristic features of the present invention, the reduced-number capturing mode includes a partial capturing mode for capturing part of pixel signals of one image region. Therefore, it is possible to capture only a part of the pixel signals in one image region when the switching means selects the partial capturing mode. The time required for reading and decoding operations can be shortened.

According to a preferable embodiment of the present invention, in addition to the above-described characteristic features of the present invention, the assuming means assumes the position where the information code is present and a contour of the information code based on pixel signals in one image region captured by the capturing means. The capturing means performs a capturing operation again when the reading means cannot optically read the information code within the contour of the information code assumed by the assuming means, by using a contour expanded from the assumed contour of the information code in the vicinity of the position assumed by the assuming means, for example, under a condition that the partial capturing mode is selected. It is possible to capture part of the pixel signals under the partial capturing mode when the capturing is performed again. Thus, even in a case that the reading and decoding operations are failed, it is possible to partly read the pixel signals in the next reading operation. The time required for reading and decoding operations can be shortened even when the next reading and decoding operations are required.

According to a preferable embodiment of the present invention, in addition to the above-described characteristic features of the present invention, the capturing means captures the pixel signals during the reduced-number capturing mode by causing driving means to drive the optical sensor at an operating frequency higher than an operating frequency used for driving the optical sensor to capture the pixel signals of one image region during the ordinary capturing mode. Therefore, it becomes possible to quickly capture the pixel signals.

According to a preferable embodiment of the present invention, in addition to the above-described characteristic features of the present invention, capturing means adjusts a thinning-out rate in a thinning-out operation for capturing the pixel signals of one image region. Therefore, it becomes possible to arbitrarily set the thinning-out rate. Thus, the general-purpose properties of the information reading apparatus can be improved.

According to a preferable embodiment of the present invention, in addition to the above-described characteristic features of the present invention, the assuming means assumes the position where the information code is present and a contour of the information code based on pixel signals in one image region captured by the capturing means. When the reading means cannot optically read the information code based on the pixel signals of the image region captured by the capturing means during the reduced-number capturing mode, the capturing means newly sets an image region that can include the information code of the assumed contour based on the position and the contour of the information code that are assumed by the assuming means. And, the capturing means again captures pixel signals within the image region being newly set as a capturing objective area. Therefore, the time required for reading and decoding operations can be shortened even when the reading and decoding operations are successively performed.

According to a preferable embodiment of the present invention, in addition to the above-described characteristic features of the present invention, when the capturing means captures pixel signals of an image region having a predetermined size during the reduced-number capturing mode and when the reading means cannot accomplish an optical reading operation for the information code based on the pixel signals of the captured image region, the capturing means detects the positions of dark point pixels existing along an outer periphery of the captured image region and additionally captures pixel signals of an image region existing outside the detected position.

For example, the present invention can be applied to a reading operation for a one-dimensional code, more specifically to a reading operation for reading a one-dimensional code including dark points formed in a striped pattern. In such a case, the reading operation may be successfully done until a certain intermediate portion comes but may fail after this intermediate portion. However, if dark points are continuously present from the failed portion and extend along the striped pattern of dark points, it is possible to restart the reading operation from the failed position to capture pixel signals expressing the one-dimensional code. The time required for reading and decoding operations can be shortened.

According to a preferable embodiment of the present invention, in addition to the above-described characteristic features of the present invention, the information code is a two-dimensional code, and the calculating means calculates vertex positions of a specific pattern defining a region of the two-dimensional code based on the pixel signals of one image region captured by the capturing means. The assuming means assumes the position where the information code is present and a contour of the information code based on the pixel signals of one image region captured by the capturing means as well as the vertex positions calculated by the calculating means. The time required for reading and decoding operations can be shortened.

According to a preferable embodiment of the present invention, in addition to the above-described characteristic features of the present invention, the capturing means captures the pixel signals under a condition that at least either the position of an image region to be captured by the optical sensor or the size of the image region to be captured by the optical sensor is determined beforehand. Therefore, it becomes easy to capture the pixel signals.

According to a preferable embodiment of the present invention, in addition to the above-described characteristic features of the present invention, the guide light emitting means emits a guide light toward a reading objective so that a user can recognize a substantial central position of one image region being imaged by the optical sensor. The guide position detecting means detects the position of the guide light in one image region when the guide light is emitted toward the reading objective. The capturing means, under the partial capturing mode, captures pixel signals from the optical sensor based on the position of the guide light being detected by the guide position detecting means. Therefore, to cause the optical information reading apparatus to read an information code, a user is only required to adjust the position of an information code, such as a one-dimensional code or a two-dimensional code, to the irradiated position of the guide light that indicates the substantial central position of one image region. Thus, it becomes possible to improve the handiness of the reading apparatus.

According to a preferable embodiment of the invention, in addition to the above-described characteristic features of the present invention, the capturing means captures the pixel signals from the optical sensor so as to include the position of the guide light detected by the guide position detecting means. Thus, it becomes possible to capture a pixel signal in a bright region to which the guide light is irradiated.

According to a preferable embodiment of the present invention, in addition to the above-described characteristic features of the present invention, the specifying means specifies the position of the guide light being set in one image region captured during emission of the guide light as being equivalent to a corresponding position in one image region captured after stopping emission of the guide light, in a case that the capturing means captures the pixel signals of the image region during the guide light emitting means emits the guide light toward the reading objective and after the guide light emitting means stops emitting the guide light. Thus, it becomes possible to identify the position of the guide light in the image region.

According to a preferable embodiment of the invention, in addition to the above-described characteristic features of the present invention, the guide light emitting means emits the guide light according to an irradiation pattern and the irradiation pattern is switched to one of plural levels. Therefore, the usability for users becomes good and the handiness of the reading apparatus is improved.

According to a preferable embodiment of the present invention, in addition to the above-described characteristic features of the present invention, the guide light emitting means, under a condition that the switching means selects the reduced-number capturing mode, emits the guide light in such a manner that the guide light points a capturing objective area of the pixel signals to be captured according to the reduced-number capturing mode. Therefore, it becomes easy for a user to recognize the image region to be captured.

According to a preferable embodiment of the present invention, in addition to the above-described characteristic features of the present invention, one image region is dissected into a plurality of unit image regions and the capturing means can capture each unit image region during the reduced-number capturing mode. Therefore, it becomes possible to perform capturing for each unit image region.

According to a preferable embodiment of the present invention, in addition to the above-described characteristic features of the present invention, the optical information reading apparatus has the capability of reading a plurality of different kinds of information codes, and an image region for capturing the pixel signals used by the capturing means during the reduced-number capturing mode is determined beforehand so as to correspond to each of the plurality of different kinds of information codes. Therefore, the capturing of the pixel signals and the reading and decoding operations can be accomplished quickly even in a case that there are plural kinds of information codes.

According to a preferable embodiment of the present invention, in addition to the above-described characteristic features of the present invention, the reading means reads each of the plurality of different kinds of information codes based on a priority order assigned to each information code. Therefore, a user is not forced to set an information code in the reading apparatus so as to correspond to a reading objective. The reading operation can be accomplished quickly.

According to a preferable embodiment of the invention, in addition to the above-described characteristic features of the present invention, when the reading means succeeds in reading pixel signals captured by the capturing means as containing one information code among the plurality of different kinds of information codes, the reading means starts a next reading operation by regarding any information code contained in pixel signals captured next time by the capturing means as being identical with the above one information code having been successfully read. Therefore, the processing can be accomplished even if the reading operation of one information code is performed continuously.

Furthermore, in order to accomplish the above and other related objects, the present invention provides a method for optically reading an information code contained in pixel signals of an image region being imaged by an optical sensor. The information reading method of the present invention includes a step of selecting one of a plurality of capturing modes in accordance with predetermined conditions being set in a reading apparatus unit, and a step of capturing the pixel signals in the one image region being imaged by the optical sensor according to a selected capturing mode. The capturing modes according to the present invention include at least an ordinary capturing mode and a reduced-number capturing mode being registered beforehand in the reading apparatus unit. The ordinary capturing mode is for capturing all of pixel signals contained in one image region being imaged by the optical sensor, and the reduced-number capturing mode is for capturing a reduced number of pixel signals in the one image region compared with the pixel signals captured when the ordinary capturing mode is selected.

Preferably, a type of information code is one of the predetermined conditions being set in the reading apparatus unit, and one of plurality of capturing modes is selected in accordance with the type of information code.

Preferably, an optical reading operation is performed when a minimum number of dark point pixels contained in pixel signals of the one image region is larger than a predetermined value under a condition that the reduced-number capturing mode is selected.

Preferably, there is a step of preliminarily capturing pixel signals of one image region for setting reading conditions of the information code under a condition that the reduced-number capturing mode is selected.

Preferably, the reduced-number capturing mode includes a high-speed capturing mode for capturing pixel signals of the one image region being imaged by the optical sensor by thinning some pixel signals out every predetermined number of scanning lines.

Preferably, the reduced-number capturing mode includes a partial capturing mode for capturing part of pixel signals of the one image region.

Preferably, there is a step of assuming a position where the information code is present and a contour of the information code based on pixel signals in the one image region. A capturing operation is performed again, when the information code cannot be optically read within the assumed contour of the information code, by using a contour expanded from the assumed contour of the information code in the vicinity of the assumed position.

Preferably, the optical sensor is driven during the reduced-number capturing mode to capture pixel signals of the one image region at an operating frequency higher than an operating frequency used for driving the optical sensor to capture the pixel signals of the one image region during the ordinary capturing mode.

Preferably, there is a step of adjusting a thinning-out rate in a thinning-out operation for capturing the pixel signals of the one image region being imaged by the optical sensor.

Preferably, there is a step of assuming a position where the information code is present and a contour of the information code (B) based on pixel signals in the one image region. When the information code cannot be optically read based on pixel signals of the image region captured during the reduced-number capturing mode, an image region that can include the information code having the assumed contour is newly set based on the position and the contour of the information code that are assumed. And, the step of capturing pixel signals is performed again with the image region being newly set as a capturing objective area.

Preferably, there is a step of detecting the positions of dark point pixels existing along an outer periphery of a captured image region having a predetermined size and additionally capturing pixel signals of an image region existing outside the captured image region, when an optical reading operation for the information code cannot be accomplish based on the pixel signals of the captured image region during the reduced-number capturing mode.

Preferably, the information code is a two-dimensional code, and a step of calculating vertex positions of a specific pattern defining a region of the two-dimensional code is performed based on the pixel signals of the one image region. And, a step of assuming a position where the information code is present and a contour of the information code is performed based on the pixel signals of the one image region as well as the calculated vertex positions.

Preferably, the step of capturing the pixel signals is performed under a condition that at least either the position of an image region to be captured by the optical sensor or the size of the image region to be captured by the optical sensor is determined beforehand.

Preferably, there are steps of emitting a guide light toward a reading objective so that a user can recognize a substantial central position of the one image region being imaged by the optical sensor, and detecting the position of the guide light in the one image region when the guide light is emitted toward the reading objective. The step of capturing the pixel signals from the optical sensor is performed based on the detected position of the guide light.

Preferably, the step of capturing the pixel signals from the optical sensor is performed so as to include the detected position of the guide light.

Preferably, there is a step of specifying a position of the guide light being set in one image region captured during emission of the guide light as being equivalent to a corresponding position in one image region captured after stopping emission of the guide light, in a case that the pixel signals of the image region are captured during emission of the guide light toward the reading objective and after stopping emission of the guide light.

Preferably, the guide light is emitted according to an irradiation pattern and the irradiation pattern is switched to one of plural levels.

Preferably, under a condition that the reduced-number capturing mode is selected, emission of the guide light is performed in such a manner that the guide light points a capturing objective area of the pixel signals to be captured according to the reduced-number capturing mode.

Preferably, there is a step of dissecting the one image region into a plurality of unit image regions so that each unit image region can be captured during the reduced-number capturing mode.

Preferably, the reading apparatus unit has the capability of reading a plurality of different kinds of information codes, and an image region for capturing the pixel signals used during the reduced-number capturing mode is determined beforehand so as to correspond to each of the plurality of different kinds of information codes.

Preferably, each of the plurality of different kinds of information codes is read based on a priority order assigned to each information code.

Preferably, when a reading operation based on captured pixel signals results in successfully identifying one information code among the plurality of different kinds of information codes, a next reading operation begins by regarding any information code contained in pixel signals captured next time as being identical with the one information code having been successfully read.

BRIEF DESCRIPTION OF THE DRAWINGS

The above and other objects, features and advantages of the present invention will become more apparent from the following detailed description which is to be read in conjunction with the accompanying drawings, in which.

DESCRIPTION OF THE PREFERRED EMBODIMENTS

Preferred embodiments of the present invention will be explained hereinafter with reference to attached drawings.

First Embodiment

Hereinafter, a first embodiment of the present invention will be explained with reference to FIGS. 1 to 3.

Figure 1:
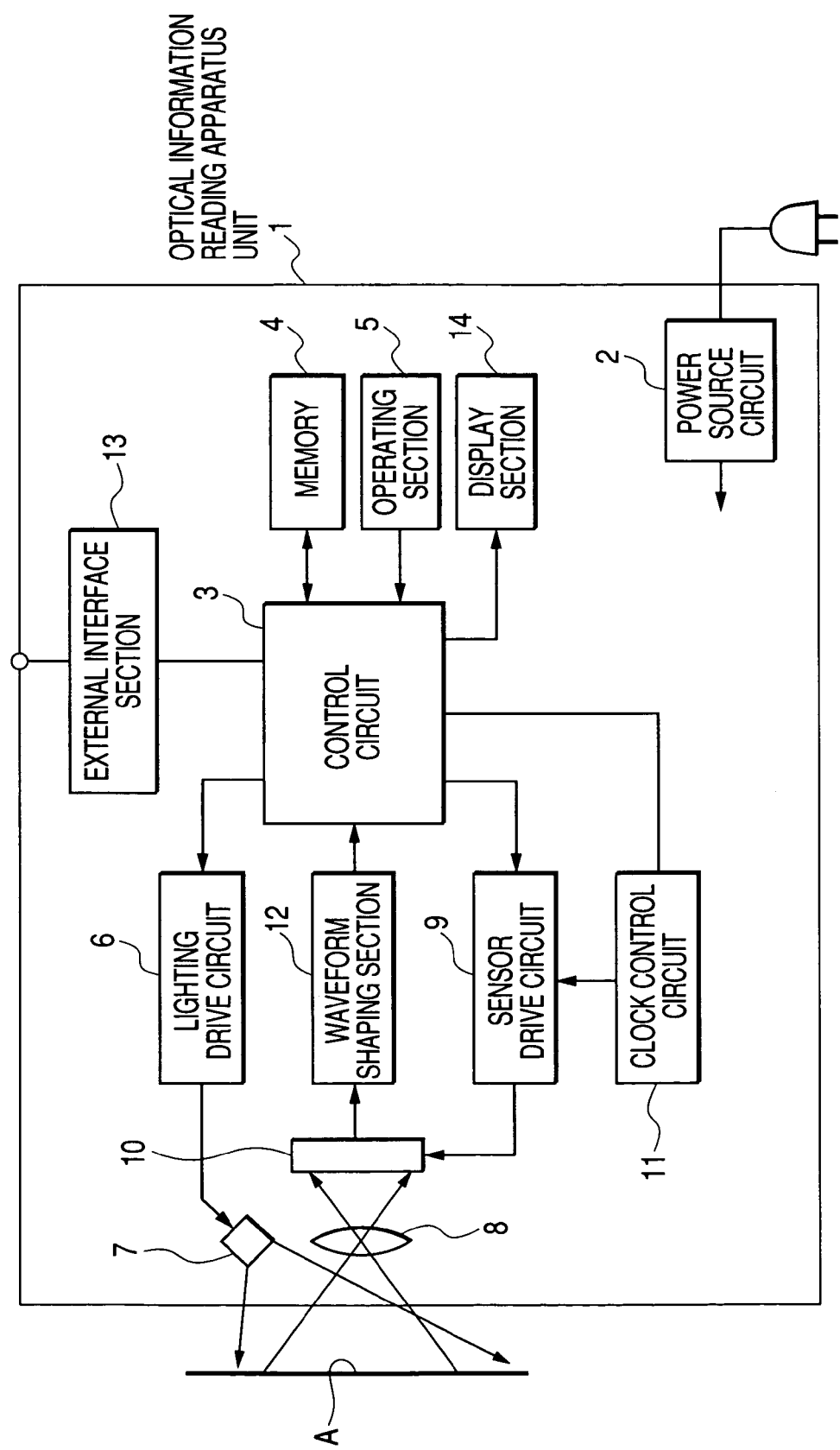
FIG. 1 is a circuit diagram showing an electric arrangement of an optical information reading apparatus in accordance with a first embodiment of the present invention.
Figure 2:
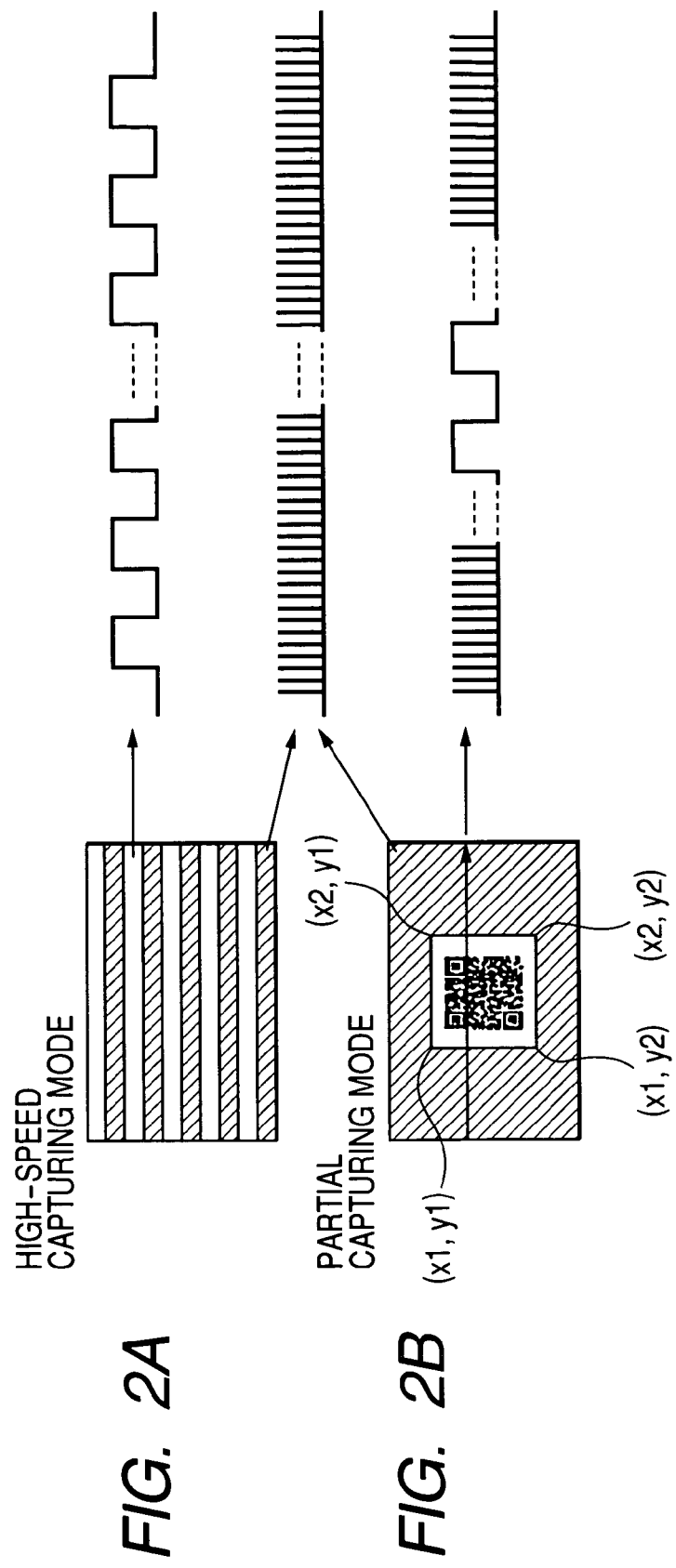
FIG. 2A is a diagram explaining a high-speed capturing mode of the optical information reading apparatus performed in accordance with the present invention.
FIG. 2B is a diagram explaining a partial capturing mode of the optical information reading apparatus performed in accordance with the present invention.

FIG. 1 schematically shows an electric arrangement of an optical information reading apparatus.

The optical information reading apparatus (hereinafter, referred to as a reading apparatus unit) 1 is used for optically reading an information code 'B' printed on a reading objective 'A'. The information code 'B' includes a one-dimensional code such as a bar code or a two-dimensional code consisting of a plurality of cells disposed in a matrix or two-dimensional pattern to constitute a predetermined bright and dark pattern (refer to FIGS. 6A and 6B).

The reading apparatus unit 1 includes a power source circuit 2, a control circuit 3, a memory 4, an operating section 5, a lighting drive circuit 6, an irradiating section 7, an image-forming means 8, a sensor drive circuit 9, an optical sensor 10, a clock control circuit 11, a waveform shaping section 12, an external interface section 13, and a display section 14. The control circuit 3 corresponds to a switching means, a capturing means, a reading means, and an assuming means of the present invention.

The power source circuit 2 is, for example, arranged by an AC/DC converter and converts an alternating-current electric power supplied from an outside into a direct-current electric power. The direct-current electric power is supplied to every constituent component in the reading apparatus unit 1. The power source circuit 2 should be provided when the need arises. For example, in a case that the optical information reading apparatus is a handy type, the apparatus will be driven by a built-in battery and no special power source circuit will be required.

The control circuit 3 is, for example, arranged by a microcomputer and performs an overall control of the reading apparatus unit 1 based on a control program. Details of the control performed by the control circuit 3 will be explained later. The operating section 5 is, for example, arranged by various operation setting keys including a trigger key and numerical keys. When a user or the like operates the trigger key, the reading apparatus unit 1 starts its operation based on the control of the control circuit 3. The lighting drive circuit 6 gives a drive signal to the irradiating section 7 based on the control of the control circuit 3. The irradiating section 7 is, for example, arranged by an LED or the like and emits a light toward a reading objective 'A' in response to the drive signal given from the lighting drive circuit 6.

The image-forming means 8 is, for example arranged by a lens, and images the light emitted from the irradiating section 7 and reflected by the reading objective 'A' and gives the formed image to the optical sensor 10. The optical sensor 10 is, for example, referred to as an area sensor. For example, the optical sensor 10 is arranged by CCDs or comparable light-receiving elements that are disposed in a two-dimensional pattern. By setting the corresponding light-receiving elements or their regions (i.e. a capturing objective area), all of the pixel signals can be independently captured. The reflection light reflected from the reading objective 'A' is photoelectrically converted by the optical sensor 10. The exposure time required for this optical sensor 10 can be determined by the control circuit 3.

When the control circuit 3 drives and controls the optical sensor 10 via the sensor drive circuit 9 based on a later-described capturing mode, the optical sensor 10 gives a photoelectrically converted signal to the waveform shaping section 12 based on a capturing mode. The sensor drive circuit 9 gives a clock to the optical sensor 10 to output pixel signals from the light-receiving elements of the optical sensor 10. According to this embodiment, for example, the total number of pixels consisting of one line is 1001 or more. More specifically, this embodiment is based on the optical sensor 10 consisting of light-receiving elements disposed in a two-dimensional arrangement of 1077 pixels×788 pixels.

The waveform shaping section 12 amplifies the signal being photoelectrically converted by the optical sensor 10 and gives a brightness level signal to the control circuit 3. The control circuit 3 determines an amplification factor of the waveform shaping section 12. The external interface section 13 has the capability of inputting and outputting data between the control circuit 3 and an external apparatus (not shown). The display section 14 has the capability of visually showing an image captured by the optical sensor 10 and processed by the control circuit 3.

Furthermore, the reading apparatus unit 1 has a plurality of capturing modes being registered beforehand. Hereinafter, the capturing modes will be explained with reference to FIGS. 2A and 2B. The reading apparatus unit 1 according to this embodiment has three capturing modes. However, according to this invention, it will be acceptable that the reading apparatus unit 1 has an ordinary operating mode and only one other capturing mode among these modes. If necessary, it will be possible to add other modes being described later or any other modes not explained hereinafter. It is needless to say that there is no necessity of adding such modes.

As to Capturing Mode (1) Ordinary Capturing Mode (Corresponding to an Ordinary Capturing Mode of the Present Invention)

The ordinary capturing mode is a mode for capturing all of the pixel signals of one image of the reading objective 'A' having being imaged by the optical sensor 10. The control circuit 3 controls the sensor drive circuit 9 via the clock control circuit 11 to adjust a transfer clock frequency given to the optical sensor 10. The transfer clock frequency is switched to an operating frequency in a performance guaranteed region of the optical sensor 10 (i.e. a frequency that is lower than the operating frequency used in a later-described mode) so that the optical sensor 10 operates at relatively low speeds. In this case, the sensor drive circuit 9 drives the optical sensor 10 at the transfer clock frequency being thus determined. The optical sensor 10 gives pixel signals to the waveform shaping section 12. In this case, each light-receiving element in the optical sensor 10 can stably output a pixel signal because the transfer clock frequency is set to somewhere in the performance guaranteed region of the optical sensor 10. The control circuit 3 can thus stably capture all of the pixel signals in one image region being imaged by the optical sensor 10 under a quality guaranteed condition.

(2) High-speed Capturing Mode (Corresponding to a Reduced-number Capturing Mode and a High-speed Capturing Mode of the Present Invention)

The high-speed capturing mode is a mode for capturing a reduced number of pixel signals compared with the number of all pixel signals in one image region of the reading objective 'A' being imaged by the optical sensor 10. FIG. 2A schematically shows the operation under the high-speed-capturing mode. In this case, the control circuit 3 adjusts via the clock control circuit 11 the operating frequency given from the sensor drive circuit 9 to drive the optical sensor 10. More specifically, the control circuit 3 switches the operating frequency for driving the optical sensor 10 by setting it somewhere outside the performance guaranteed region of the optical sensor 10 and within the operation guaranteed region (i.e. a frequency that is higher than the operating frequency used in the ordinary capturing mode) on one hand and setting it to the previously described frequency used in the ordinary capturing mode on the other hand. For example, switching of the operating frequency is performed every predetermined number of scanning lines in one image region (e.g. one scanning line). In FIGS. 2A and 2B, each hatched portion is a region where the operating frequency is set to a relatively high value and the remaining non-hatched portion is a region where the operating frequency is set to a relatively low value.

In this case, the sensor drive circuit 9 drives the optical sensor 10 at the operating frequency being thus determined so that the optical sensor 10 gives a pixel signal to the waveform shaping section 12. Setting of the operating frequency is performed every predetermined number of scanning lines to selectively set the operating frequency somewhere outside the performance guaranteed region of the optical sensor 10 and within the operation guaranteed region. When the operating frequency is set outside the performance guaranteed region, it becomes possible to capture a reduced number of pixel signals in a thinning-out fashion. If a thinning-out rate is determined beforehand in the control circuit 3 and the memory 4, it will be possible to perform the thinning-out operation for pixel signals of designated scanning lines in the image region based on the thinning-out rate being thus determined beforehand.

(3) Partial Capturing Mode (Corresponds to a Reduced-number Capturing Mode and a Partial Capturing Mode of the Present Invention)

The partial capturing mode is a capturing mode for capturing a reduced number of pixel signals compared with all pixel signals in one image region of the reading objective 'A' being imaged by optical sensor 10 and also a capturing mode for capturing a part of pixel signals in one image region. FIG. 2B schematically shows the operation under the partial capturing mode. According to this partial capturing mode, like the previously described high-speed capturing mode, the control circuit 3 switches and controls the operating frequency by setting it somewhere outside the performance guaranteed region of the optical sensor 10 and within the operation guaranteed region on one hand and setting it to the operating frequency used in the ordinary capturing mode on the other hand. It is thus possible for the control circuit 3 to capture only the pixel signals in a specific partial region by designating a region connecting the vertices of (x1, y1), (x2, y1), (x1, y2) and (x2, y2) in the image region (refer to FIGS. 2A and 2B).

The reading apparatus unit 1 can automatically change the capturing mode as described later, and is also arranged to select one of the ordinary capturing mode, the high-speed capturing mode, and the partial capturing mode in response to a key input made by a user through an operating section 5. Furthermore, when the high-speed capturing mode is selected, the reading apparatus unit 1 sets a thinning-out rate in capturing the pixel signals of one image region by performing the thinning-out operation every predetermined number of scanning lines. In this case, the thinning-out rate can be set by a user, and accordingly it is easy to adjust the time required for capturing the pixel signals. The general-purpose properties of the optical information reading apparatus can be improved.

An operation of the above-described arrangement will be explained with reference to FIG. 3.

Figure 3:
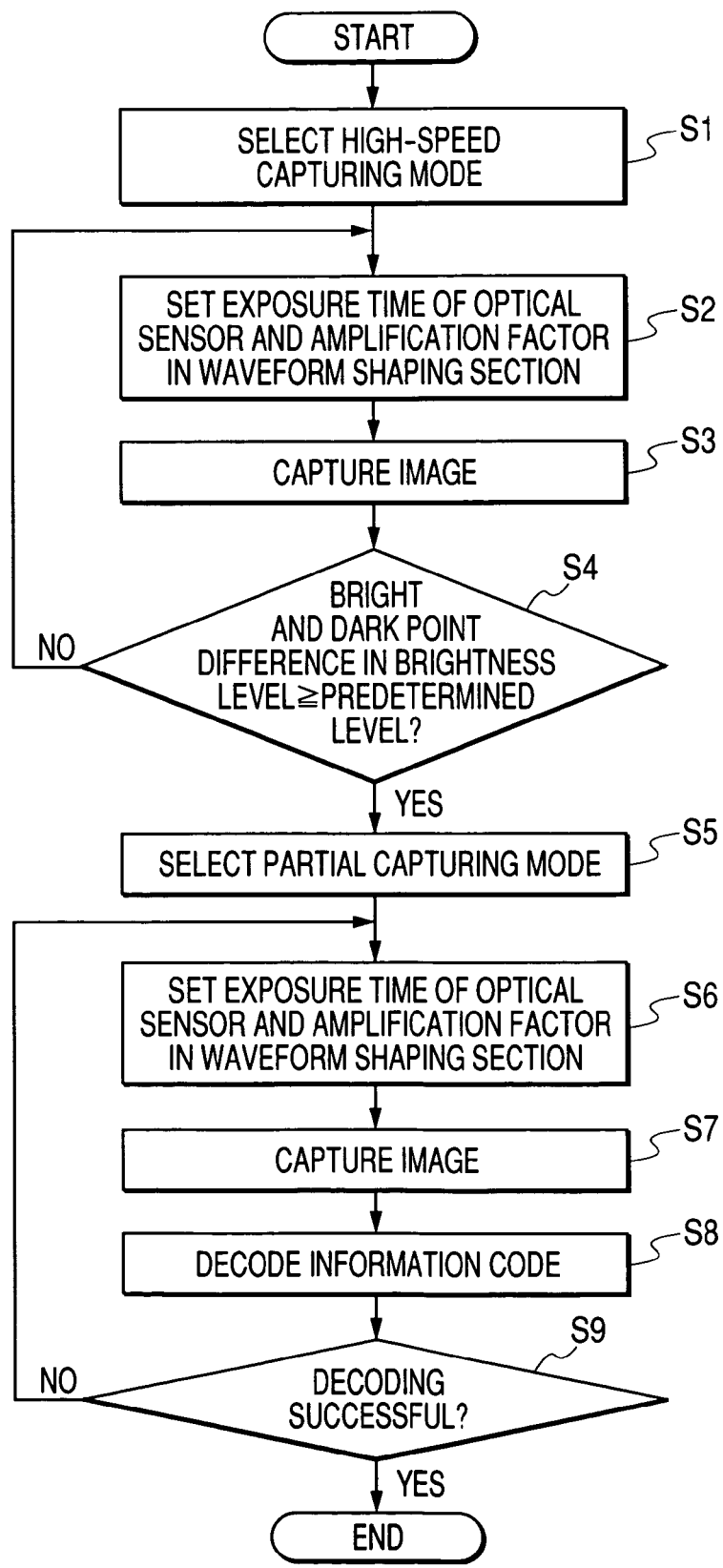
FIG. 3 is a flowchart showing an operation of the optical information reading apparatus in accordance with the first embodiment of the present invention.

FIG. 3 is a flowchart showing the processing performed by the optical information reading apparatus for reading and decoding an information code.

When a user operates a trigger switch of the operating section 5, a reading instruction signal is input to the control circuit 3. The reading apparatus unit 1 starts reading and decoding operations. In this case, the control circuit 3 selects the high-speed capturing mode for the capturing mode of the reading apparatus unit 1 (refer to step S1). Furthermore, the control circuit 3 sets an exposure time of the optical sensor 10 and an amplification factor of an amplifying circuit in the waveform shaping section 12 (refer to step S2). Then, the control circuit 3 captures pixel signals of one image region according to the high-speed capturing mode (refer to step S3). In this case, the control circuit 3 receives the pixel signals of one image region from the waveform shaping section 12, and compares a minimum value of the brightness level assumed as a bright point (white) and a maximum value of the brightness level assumed as a dark point (black) among all of the pixel signals to check whether a difference between the compared minimum and maximum values is equal to or larger than a predetermined level (refer to step S4). In other words, the control circuit 3 judges an offset or biased degree of the brightness level toward a bright point or a dark point.

In this case, when the judgment result in step is NO in the step S4, the control circuit 3 returns to the above-described step S2 and again sets the exposure time of the optical sensor 10 and the amplification factor of the waveform shaping section 12 and then repeats the capturing of the pixel signals of one image. More specifically, in this case, the information code 'B' consists of bright points (i.e. white points) and dark points (i.e. black points). If the exposure time and the amplification factor are appropriate, the difference between the brightness levels among the pixel signals of one image region will become large. Thus, when the judgment in the step S4 becomes YES, it is possible to estimate that the information code 'B' exists in the capturing image region.

The control circuit 3 sets the partial capturing mode when the judgment result in step S4 is YES, namely when the control circuit 3 estimates that the information code 'B' is present in the capturing image region (refer to step S5). Then, the control circuit 3 sets an exposure time of the optical sensor 10 and an amplification factor of the amplifying circuit in the waveform shaping section 12 (refer to step S6). Then, the control circuit 3 captures pixel signals according to the partial capturing mode (refer to step S7). Under the partial capturing mode, the control circuit 3 sets a predetermined capturing objective area, for example, in a predetermined central region, i.e. a region connecting the vertices of (x1, y1), (x2, y1), (x1, y2) and (x2, y2), shown in FIG. 2B. Then, the control circuit 3 captures the pixel signals in this designated partial region. Then, the control circuit 3 converts the captured pixel signals into binary-coded data so that a pixel signal having the brightness level not smaller than a predetermined first threshold is referred to as a bright point and a pixel signal having the brightness level not larger than a predetermined second threshold is referred to as a dark point. In other words, the pixel signals are converted into digital values representing bright points and dark points, respectively. The memory 4 stores the converted data to decode. Regarding a relationship between the first and second thresholds, a setting value for the first threshold is larger than that of the second threshold. Accordingly, the decoding operation is performed based on the pixel signals captured according to the partial capturing mode. The time required for reading and decoding operations can be shortened.

Then, the control circuit 3 decodes the information code 'B' (refer to step S8). In this case, the control circuit 3 makes a judgment as to whether or not the decoding is successful (refer to step S9). When the decoding is successful (i.e. YES in step S9), the control circuit 3 terminates this routine.

When the decoding is not successful (i.e. NO in step S9), the control circuit 3 returns to the step S6 to repeat the above-described processing of steps S6 to S9. In this manner, the reading apparatus unit 1 performs an optical scanning operation to read the information code 'B', such as QR codes or other two-dimensional codes as well as bar codes or other one-dimensional codes. And, the reading apparatus unit 1 performs a decoding operation based on the pixel signals captured according to the partial capturing mode. The time required for reading and decoding operations can be shortened.

As described above, according to this embodiment, the control circuit 3 captures the pixel signals of each scanning line when the high-speed capturing mode is selected. When it is assumed based on the captured pixel signals that the information code 'B' is present in one image region, the control circuit 3 switches the capturing mode into the partial capturing mode and sets a capturing objective area at a predetermined central area. The control circuit 3 captures the pixel signals of the image in this capturing objective area, and decodes the captured pixel signals. Accordingly, even when the optical sensor 10 has the higher resolution of 1077 pixels×788 pixels in total pixel number, it is not necessary to capture all of the pixel signals of the entire image region. Thus, the time required for reading and decoding operations can be shortened.

Second Embodiment

Figure 4:
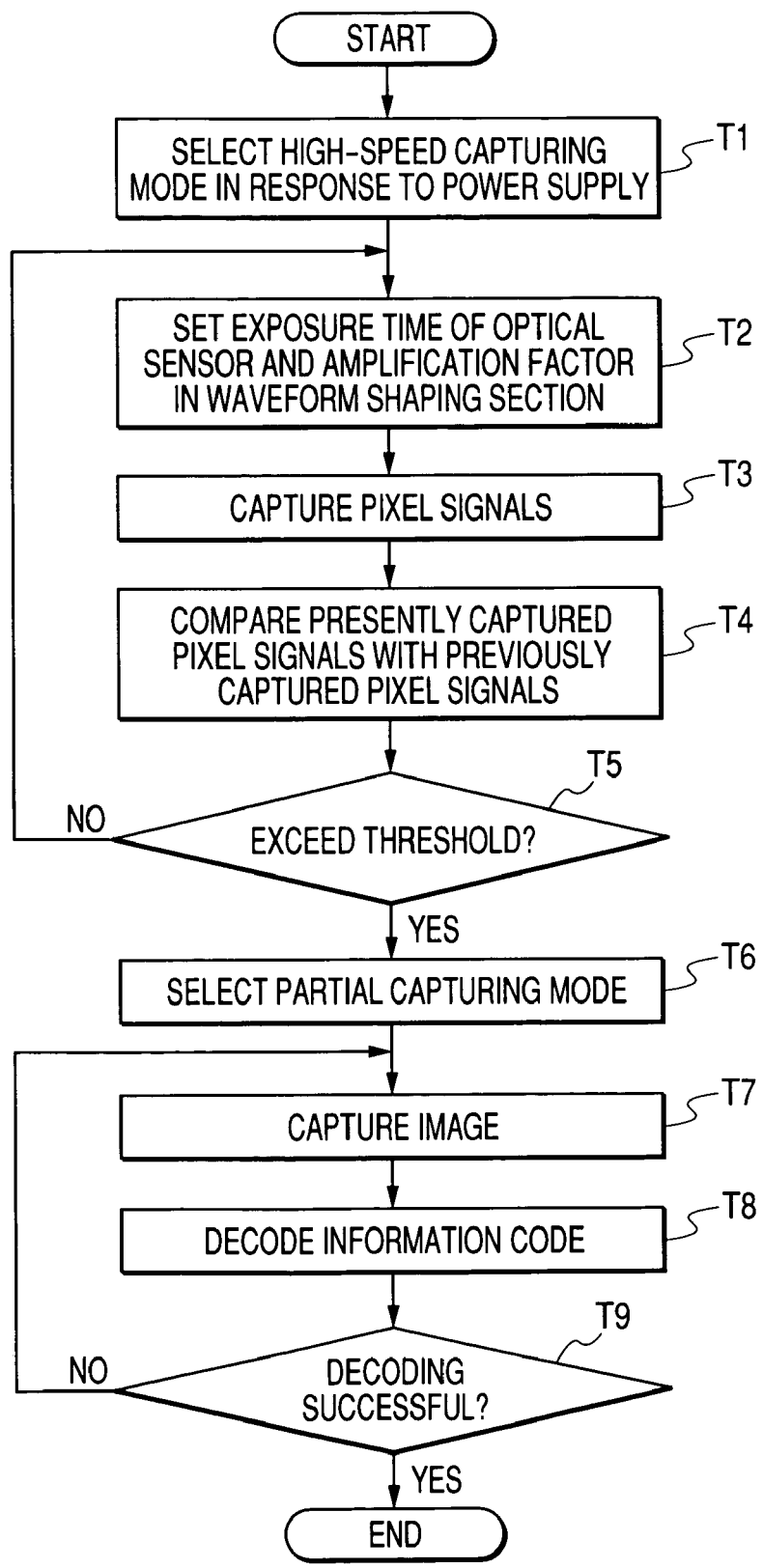
FIG. 4 is a flowchart corresponding to FIG. 3 but showing an operation of the optical information reading apparatus in accordance with a second embodiment of the present invention.

FIG. 4 is given for explaining a second embodiment of the present invention that is different from the first embodiment in that the optical information reading apparatus is a stationary type and uses a different control operation. An electric arrangement of the second embodiment identical with that of the previously described embodiment is denoted by the same reference numeral. Hereinafter, only a different portion will be explained as partial replacement for the previously described embodiment.

FIG. 4 is a flowchart showing an operation of a stationary reading apparatus unit 1. The stationary reading apparatus unit 1 is not equipped with a trigger switch (refer to the above-described explanation) in the operating section 5. When the stationary reading apparatus unit 1 is installed at a specific place and electric power is supplied, the stationary reading apparatus unit 1 periodically picks up an image of a reading objective 'A' and decodes an information code 'B'. Shortening the reading and decoding time is required in such an apparatus. This embodiment explains how the practical shortening in the reading and decoding time is realized in such a stationary reading apparatus unit by performing the control operation shown in FIG. 4.

When electric power is supplied to the stationary reading apparatus unit 1, the control circuit 3 sets the operating mode of the reading apparatus unit 1 to the high-speed capturing mode as an initial stage (refer to step T1). Then, the control circuit 3 sets an exposure time of the optical sensor 10 and an amplification factor of an amplifying circuit in the waveform shaping section 12 (refer to step T2). Furthermore, the reading apparatus unit 1 periodically picks up an image of a reading objective 'A' and the control circuit 3 captures pixel signals of one image region. Then, the control circuit 3 causes the memory 4 to successively store binary-coded data of the captured pixel signals. Then, the control circuit 3 compares the present data with binary-coded data of previously captured pixel signals that are stored in the memory 4 (refer to steps T3 to T5).

More specifically, the control circuit 3 checks the memorized contents of the memory 4. When there is any difference between the binary-coded data of the presently captured pixel signals and the binary-coded data of the previously captured pixel signals, the control circuit 3 counts the pixel signals having shown any change. When a counted pixel number exceeds a predetermined threshold, the control circuit 3 presumes that an information code is present in the captured image region and then executes the capturing and decoding processing shown in steps T6 to T9. On the other hand, when the control circuit 3 presumes that no information code is present in the captured image region, the control circuit 3 returns to the step T2 to repeat the above-described processing of steps T2–T5.

In the step T6, the control circuit 3 sets the partial capturing mode for the reading operation of the reading apparatus unit 1. This setting, as explained in the previously described embodiment, enables the control circuit 3 to capture only the image located in a designated central region. Then, the control circuit 3 captures the image and decodes the information code (refer to steps T7 and T8). The control circuit 3 terminates this routine when the decoding is accomplished successfully (i.e. YES in the step T9), and returns the step T7 to repeat the above-described processing when the decoding is failed (i.e. NO in the step T9).

As described above, the control circuit 3 preliminarily captures pixel signals of one image region for setting reading conditions of the information code 'B' under the condition that the high-speed capturing mode is selected. Then, the control circuit 3 sets the partial capturing mode for the operating condition of the reading apparatus unit 1 under the reading conditions having been thus set, and performs recapturing of pixel signals. Therefore, it becomes possible to shorten the time required for setting the reading conditions of the information code 'B'.

Furthermore, even when the present invention is applied to the stationary information code reading apparatus, the control circuit 3 switches the capturing mode to the partial capturing mode when the presence of the information code 'B' within one image region is estimated based on the comparison between the data of previously captured pixel signals and the data of presently captured pixel signals under the high-speed capturing mode. The control circuit 3 captures the image under the partial capturing mode and decodes the information code. With this arrangement, in a stationary information code reading apparatus, even when the optical sensor 10 has the higher resolution of 1077 pixels×788 pixels, there is no necessity of capturing all of the pixel signals in one image region. The time required for reading and decoding operations can be shortened.

Third Embodiment

Figure 5:
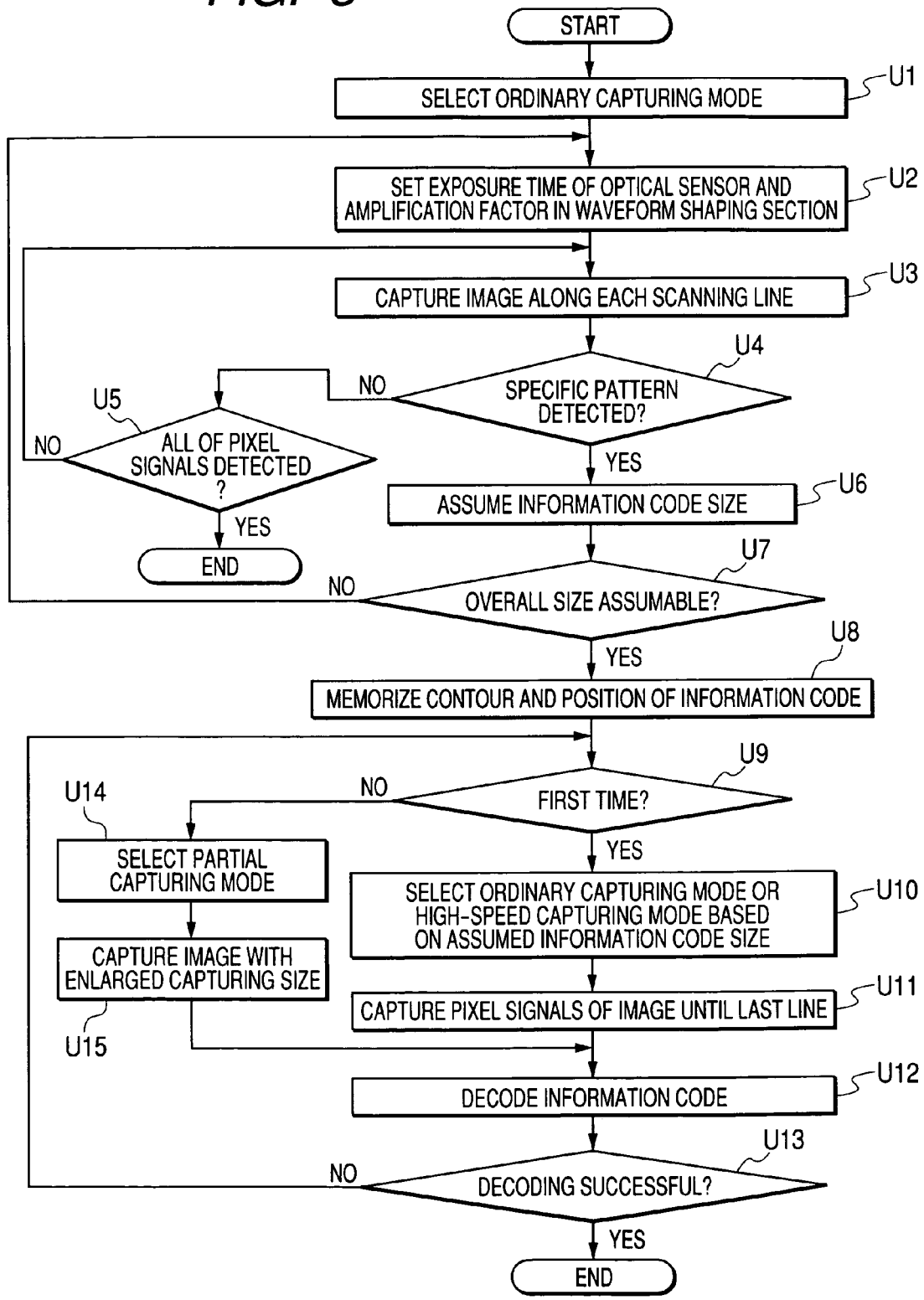
FIG. 5 is a flowchart corresponding to FIG. 3 but showing an operation of the optical information reading apparatus in accordance with a third embodiment of the present invention.
Figure 6A:
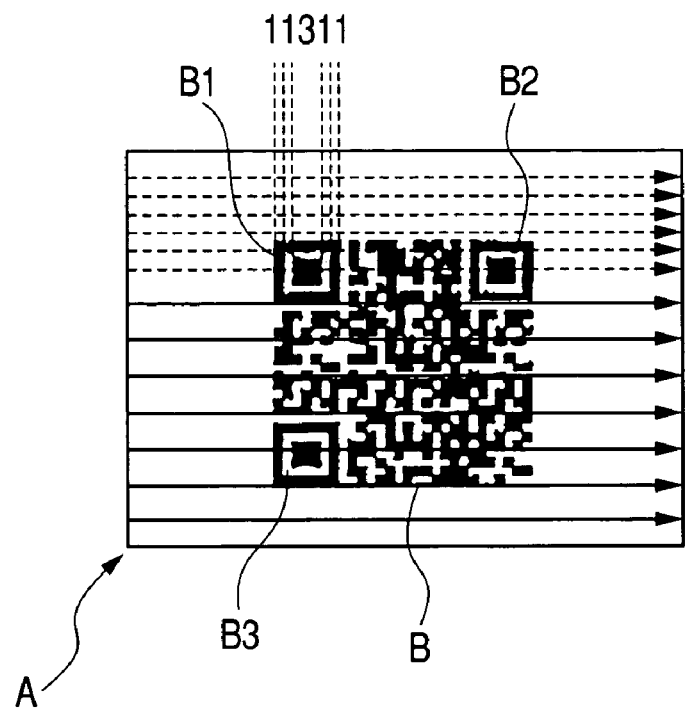
FIGS. 6A and 6B are diagrams explaining a reading operation of the optical information reading apparatus in accordance with the third embodiment of the present invention.
Figure 6B:
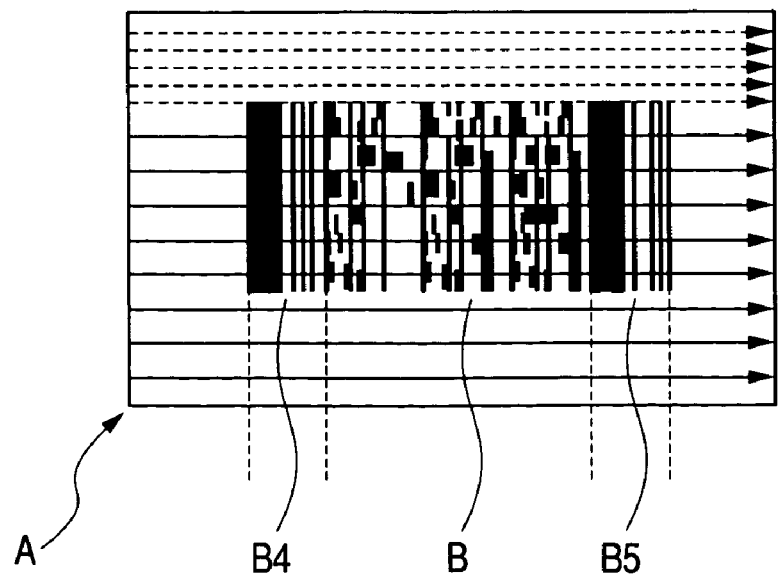

FIGS. 5, 6A and 6B are given for explaining a third embodiment of the present invention that is different from the first embodiment in its control and operation. An electric arrangement substantially identical with that of the previously described first embodiment is denoted by the same reference numeral. Hereinafter, only a different portion will be explained as partial replacement for the previously described embodiment. Prior to explanation for the third embodiment, an arrangement of the information code 'B' will be schematically explained hereinafter. The information code 'B' includes a specific pattern. This specific pattern is used for enabling the reading apparatus unit 1 to recognize the information code 'B'. For example, a QR code includes a pattern that is referred to as a segmented symbol. In general, the QR code consists of square cells combined so as to form an information code including a segmented symbol portion and a data portion.

The specific pattern, for example in the case of a QR code shown in FIG. 6A, consists of segmented symbols B1, B2, and B3 that are positioned at upper left, upper right, and lower left portions of the information code 'B', respectively. Each of the segmented symbols B1, B2, and B3 is arranged as an assembly of coaxial square frames defining an alternation of a dark point, a bright point, a dark point, a bright point, and a dark point whose widths are regulated at a predetermined ratio of 1:1:3:1:1 (refer to FIGS. 6A and 6B). Therefore, detecting the bright and dark pattern having this ratio causes the reading apparatus unit 1 to recognize the information code 'B' as a QR code.

Furthermore, as is well known, the QR code fixes the ratio of the size of such a specific pattern relative to the size of an overall contour. In other words, it is possible to assume the overall size of a detected QR code. Furthermore, in the case of a PDF-417 code for example shown in FIG. 6B, the reading apparatus unit 1 can recognize a PDF-417 code when a width ratio of a start code B4 and a stop code B5 consisting of an information code 'B' agrees with a predetermined ratio. Hence, this embodiment judges an appropriate method for capturing the image so as to utilize the characteristics of this information code, which leads to shortening of reading and decoding time.

FIG. 5 is a flowchart schematically showing the contents of the control and operation in accordance with the third embodiment. First, in the flowchart shown in FIG. 5, when a user operates the trigger switch of the operating section 5, the control circuit 3 sets the-ordinary capturing mode for operating the reading apparatus unit 1 (refer to step U1). In the ordinary capturing mode, the control circuit 3 sets an exposure time of the optical sensor 10 and an amplification factor of the amplifying circuit in the waveform shaping section 12 (refer to step U2). Then, the control circuit 3 successively captures an image along each scanning line until capturing of one image region is accomplished. Then, the control circuit 3 makes a judgment as to whether a specific pattern of the information code 'B' is detected (refer to steps U3 to U5). In this case, when the control circuit 3 detected a specific pattern, the control circuit 3 assumes and detects an overall size of the information code 'B' based on a ratio of the pixel signals arranging this specific pattern (refer to step U6). Then, the control circuit 3 makes a judgment as to whether an overall size of the information code 'B' is assumable (refer to step U7). When the control circuit 3 can assume the overall size of the information code 'B' (i.e. YES in step U7), the control flow proceeds to the next step U8 and its succeeding processing. On the other hand, when the control circuit 3 cannot assume the overall size, the control flow returns to the step U2 to repeat the above processing of steps U2–U7.

The control circuit 3, when it can assume the overall size of the information code 'B', causes the memory 4 to memorize the contour of the information code 'B' and its position (refer to step U8). Then, the control circuit 3 makes a judgment as to whether this is a first capturing of the pixel signals in the image (refer to step U9). When this is the first capturing of the pixel signals in the image (i.e. YES in step U9), the control circuit 3 sets the ordinary capturing mode or the high-speed capturing mode based on the assumed overall size of the information code (refer to step U10). Then, the control circuit 3 continues the capturing of pixel signals until the final scanning line (refer to step U11). For example, in the case of a QR code, there is a practical method for judging whether or not the contour of a QR code occupies a large area in one image region. According to this method, exceeding a predetermined value in the number of pixel signals existing in the specific pattern region of the QR code leads to a conclusion that the contour of this QR code occupies a large area in one image region.

There is another example. For instance, as shown in FIG. 6A, a QR code has a total of three specific patterns. In this case, if the capturing of a segmented symbol portion of a QR code obtains a sequence of '1111100000111111111111110000011111' as an arrangement of pixel signals, the control circuit 3 will identify that the pixel signal number corresponding to one cell is five and accordingly will conclude that it is not smaller than a predetermined number (e.g. 3), which will lead to a conclusion that the contour of this QR code occupies a large area in one image region. In other words, the control circuit 3 concludes that the reading is feasible at a lower resolution. The control circuit 3 assumes the size of the contour of a QR code based on these pixel signals, and then sets the high-speed capturing mode to continuously capture the image until the final scanning line. In the above sequence of numerals, 1 represents a dark point (i.e. black point) and 0 represents a bright point (i.e. white point).

On the other hand, the capturing of a segmented symbol portion of a QR code may obtain a sequence of '11001111110011' as an arrangement of pixel signals. In this case, the control circuit 3 will identify that the pixel signal number corresponding to one cell is two and accordingly will conclude that it is smaller than the predetermined number. This will lead to a conclusion that the contour of this QR code occupies a small area in one image region. In other words, the control circuit 3 concludes that the reading is unfeasible at a lower resolution. The control circuit 3 assumes the size of the contour of a QR code based on these pixel signals, and then sets the ordinary capturing mode to continuously capture the image until the final scanning line. As apparent from the above description, the control circuit 3 selectively sets the ordinary capturing mode or the high-speed capturing mode for the operating of the reading apparatus unit 1 with reference to the pixel signal number corresponding to one cell.

In this case, when the high-speed capturing mode is selected, the control circuit 3 can capture pixel signals according to a thinning-out operation performed every predetermined number of scanning lines. The control circuit 3 performs a decoding operation based on the captured pixel signals (refer to step U12). When the control circuit 3 succeeded in the decoding based on these pixel signals (i.e. YES in step U13), the control circuit 3 terminates this routine. In this case, the time required for the reading and decoding operation can be shortened because of the high-speed capturing mode having been thus selected. It is possible by hardware or by software to form an arrangement for calculating the ratio in the segmented symbol B1 region in a QR code or the ratio of the start code B4 and the stop code B5 of a PDF-417 code. Furthermore, there is the possibility that the optical sensor 10 may have a significant operation halting period (i.e. blanking period) after finishing the capturing of pixel signals of one scanning line based on the thinning-out operation. In such a case, it is possible to arrange the optical information reading apparatus so as to utilize this blanking period for allowing the control circuit 3 to calculate the above ratio based on the software processing.

More specifically, even in a case that the optical sensor 10 has a great number of pixels compared with that of a conventional sensor, it is possible to selectively control the capturing mode for capturing the pixel signals in accordance with the size of an information code. Therefore, it is possible to perform the capturing of pixel signals at an appropriate size corresponding to the size of an imaged information code without being adversely effected by the image size of the information code being picked up by the optical sensor 10. Furthermore, when the capturing of pixel signals is performed under the condition that the high-speed capturing mode is selected, there is no necessity for capturing all of the pixel signals. Thus, compared with a conventional sensor, it becomes possible to shorten the time required for reading and decoding operations.

When the control circuit 3 failed in the decoding in the step U13 (i.e. No in the step U13), the control circuit 3 sets the partial capturing mode for operating the reading apparatus unit 1 (refer to step U14) and reads the contour information and position information of the information code 'B' being stored in the step U8. The control circuit 3 sets a new contour of an enlarged size expanded from the memorized contour of the information code based on the memorized information and captures pixel signals of an image within this enlarged contour (refer to step U15). Then, in the step U12, the control circuit 3 decodes the information code 'B' and repeats the above-described processing.

According to this embodiment, the control circuit 3 sets the ordinary capturing mode for operating the reading apparatus unit 1 and successively captures pixel signals of an image along each scanning line. When a specific pattern is detected and the size of an information code is assumed, the control circuit 3 sets the ordinary capturing mode or the high-speed capturing mode based on the size of the assumed information code 'B'. The control circuit 3 continuously captures pixel signals of an image until the final scanning line and decodes the information. Accordingly, it becomes possible to selectively set the capturing mode according to the imaged size of the information code 'B' being picked up by the optical sensor 10. The general-purpose properties of the optical information reading apparatus can be improved.

Furthermore, when the control circuit 3 failed in the decoding operation, the control circuit 3 selects the partial capturing mode to capture pixel signals in an enlarged contour being set based on the contour information and position information of the information code 'B' being stored in the memory 4. The control circuit 3 decodes the information code 'B' based on the pixel signals captured according to the partial capturing mode. Therefore, even if the optical sensor 10 has the higher resolution of 1077 pixels×788 pixels in total pixel number, it is not necessity to capture all of the pixel signals. The time required for reading and decoding operations can be shortened.

Fourth Embodiment

Figure 7:
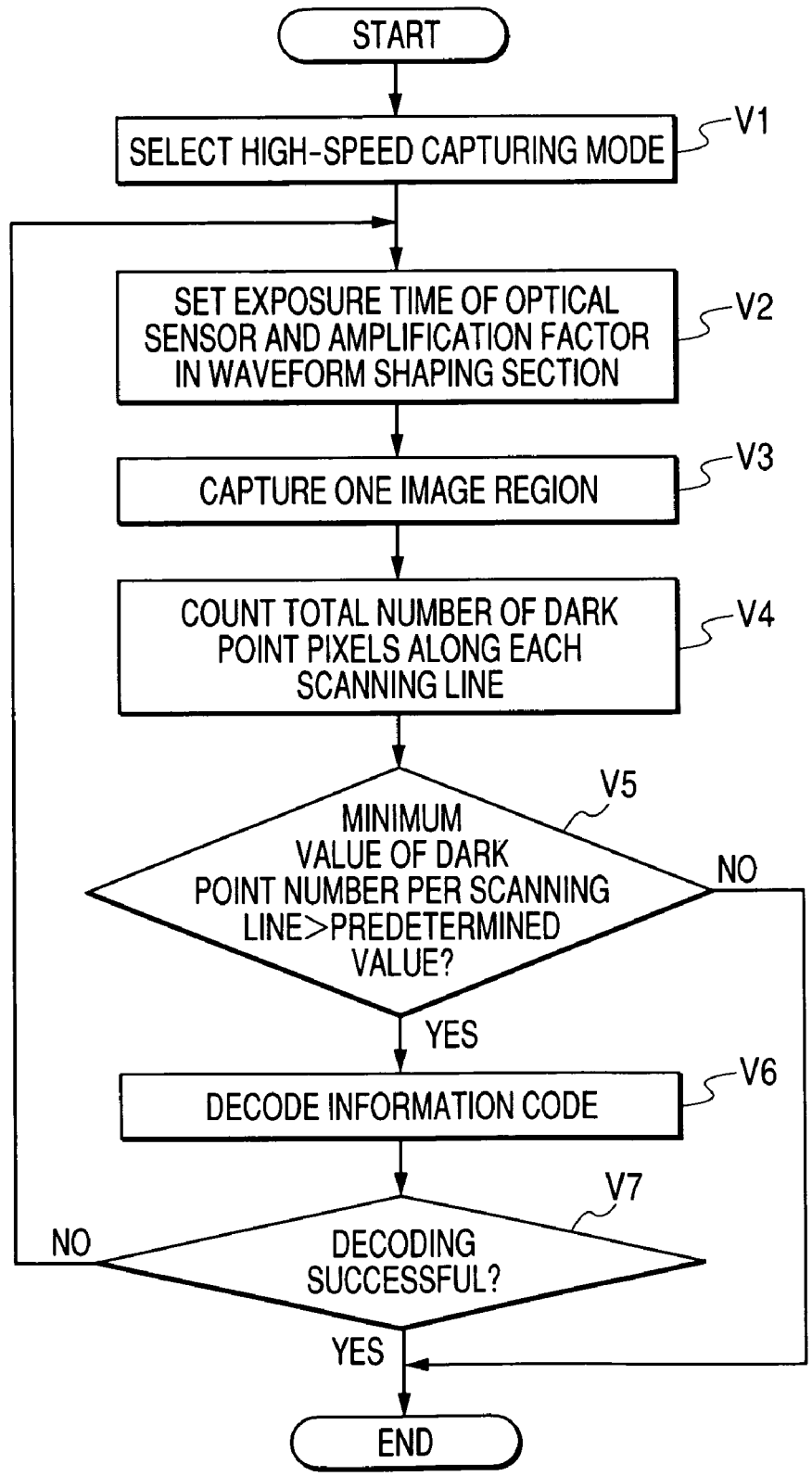
FIG. 7 is a flowchart corresponding to FIG. 3 but showing an operation of the optical information reading apparatus in accordance with a fourth embodiment of the present invention.

FIG. 7 is a view for explaining a fourth embodiment of the present invention that is different from the first embodiment in its control and operation. An electric arrangement substantially identical with that of the previously described first embodiment is denoted by the same reference numeral. Hereinafter, only a different portion will be explained as partial replacement for the previously described embodiment.

As explained in the third embodiment, even if the optical sensor 10 has a great number of pixels compared with a conventional sensor, the time required for reading and decoding operations can be shortened by utilizing the characteristics of information code 'B'. Meanwhile, utilizing the characteristics of information code 'B' is effective in shortening the time required for judging as to whether the information code 'B' is present in the captured one image region. The fourth embodiment explains the control and operation for shortening the time required for this judgment.

When a user operates a trigger switch of the operating section 5, the control circuit 3 sets the high-speed capturing mode (refer to step V1). Then, the control circuit 3 sets an exposure time of the optical sensor 10 and an amplification factor of the waveform shaping section 12 (refer to step V2). Then, the control circuit 3 captures pixel signals corresponding to one image region (refer to step V3). Then, the control circuit 3 counts the number of pixels representing dark points along each scanning line with respect to all pixel signals in the captured image region (refer to step V4). In this case, the control circuit 3 checks whether or not a minimum number of the dark points (i.e. black points) per scanning line is larger than a predetermined value (refer to step V5). When the minimum number of dark points (i.e. black points) per scanning line is larger than the predetermined value (i.e. YES in step V5), the control circuit 3 concludes that the information code 'B' is present in the captured image region. Then, the control circuit 3 decodes the information code 'B' (refer to step V6). The control circuit 3 repeats the processing until the decoding is successfully accomplished (i.e. YES in step V7). When the minimum number of dark points (i.e. black points) is not larger than the predetermined value (NO in step V5), the control circuit 3 concludes that the information code 'B' is not present in the captured image region., Thus, the control circuit 3 terminates this routine without performing the decoding processing.

As apparent from the foregoing description, according to this embodiment, the control circuit 3 sets the high-speed capturing mode for operating the reading apparatus unit 1, counts the number of dark point pixels along each scanning line with respect to all pixel signals of one image region, identifies the presence of information code 'B' within the captured image region when the minimum value of counted dark point pixels is larger than the predetermined value, and decodes the information code 'B'. Therefore, it becomes possible to shorten the time required for judging whether or not the information code 'B' is present in a captured image region even when the high-speed capturing mode is selected.

Fifth Embodiment

FIGS. 8A–8D through 11A–11B are given for explaining a fifth embodiment of the present invention that is different from the above-described embodiments in a capturing operating of pixel signals from the optical sensor and succeeding reading and decoding operations performed by the control circuit 3 when failed in optically reading the information code in the reduced-number capturing mode. The portion identical with that of the previously described embodiment is denoted by the same reference numeral and will not be explained again.

For example, as shown in FIGS. 8A–8D, the control circuit 3 dissects one image region into a plurality of capturing objective areas C arrayed at equal intervals in a vertical direction so that pixel signals of one image region can be captured in units of each capturing objective area (corresponds to a unit image region; indicated as a section being enclosed by a dotted line). Hereinafter, the explanation is separately given for a one-dimensional code and for a two-dimensional code.

In the Case of One-dimensional Code

For example, the operating section 5 generates a reading instruction of a one-dimensional code. The control circuit 3 captures pixel signals of one image region including a one-dimensional code 'B' serving as an information code. In such a case, the control circuit 3 initially sets a capturing objective area (i.e. unit image region C1 shown in the drawings) that is a thin region extending in a horizontal direction (i.e. a lateral direction) so as to include a central region when the partial capturing mode is selected. According to this embodiment, one image region (consisting of 1077 lateral pixels×778 vertical pixels) is dissected in the vertical direction (i.e. in the longitudinal direction) into a plurality of longitudinally arrayed unit image regions C each having a size of several tens (70 to 80) of pixels.

The reason why this embodiment sets a thin region extending in the lateral direction to include a central region of one image region under the partial capturing mode is as follows. The optical sensor 10 has pixels arranged in both the horizontal direction (i.e. the lateral direction) and the vertical direction (i.e., the longitudinal direction). The optical information reading apparatus unit 1, when it reads a one-dimensional code, ordinarily performs a reading operation in the horizontal direction (i.e. the lateral direction). Therefore, capturing a central region in the horizontal (i.e. lateral) direction is convenient for a user and enables the reading apparatus unit 1 to quickly accomplish the capturing operation.

Figure 8A:
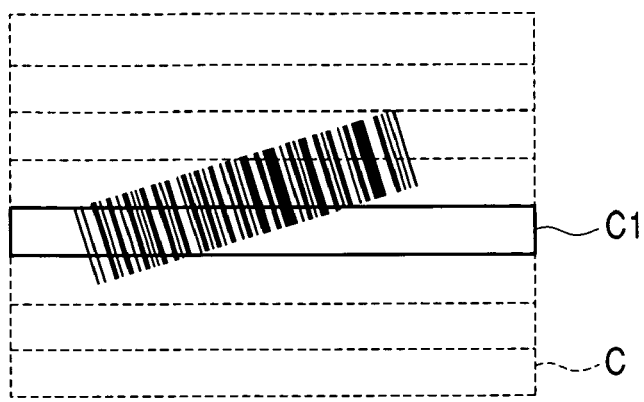
FIGS. 8A to 8D are diagrams schematically showing the change of a capturing objective area in accordance with a fifth embodiment of the present invention.

However, depending on a practical image picking-up method of the optical information reading apparatus unit 1 for imaging a one-dimensional code, there is the possibility that the control circuit 3 may capture the image of a thin region being inclined relative to the horizontal direction (i.e. lateral direction) as shown in FIG. 8A when the control circuit 3 captures a laterally extending thin region so as to include a central region under the partial capturing mode. In this case, the unit capturing objective area C1 does not include all data of one-dimensional code 'B'. Accordingly, reading and decoding one-dimensional code 'B' is unfeasible.

Hence, this embodiment provides a reading apparatus capable of accomplishing the reading and decoding operations thoroughly even in such a condition. The control circuit 3 performs a linear capturing operation in the horizontal direction (i.e. lateral direction) so as to capture pixel signals located in the central region of one image region under the condition that the partial capturing mode is selected. The control circuit 3 performs the reading and decoding operations based on the pixel signals in this image region C1 (refer to FIG. 8A). For example, it is now assumed that the one-dimensional code 'B' has a code pattern consisting of data "abcdefghijk." In this case, a part of this code pattern, e.g. "abcdefg", can be decoded when control circuit 3 reads and decodes this code pattern data. However, in this case, the control circuit 3 can confirm that the data reading operation is not accomplished yet and accordingly performs the following processing. More specifically, the control circuit 3 detects the position of each pixel representing a dark point (i.e. black point) located along the outer periphery of a captured image region. Then, the control circuit 3 additionally captures pixel signals in an image region extending outside the detected positions of respective dark pixels. Especially, when it reads one-dimensional code, the control circuit 3 searches dark points (i.e. black points) positioned in the vicinity of the pixel signals having not been read yet among the captured pixel signals. Then, the control circuit 3 again performs the capturing operation for capturing pixel signals in an image region extending along a pixel direction of dark points being continuously arrayed from the searched dark point.

Figure 8B:
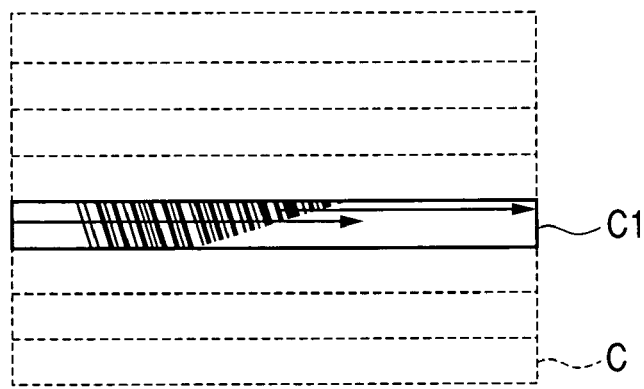

Namely, as shown in FIG. 8B, the readable data is limited to only a limited part "abcdefg" serving as a leading part of the code pattern even when the control circuit 3 performs the decoding operation based on only the pixel signals in the unit image region C1. Hence, the control circuit 3 detects the position of each pixel representing a dark point (i.e. black point) located along the outer periphery of a captured image region C1. Then, the control circuit 3 additionally captures pixel signals in an image region extending outside the detected positions of respective dark pixels.

More specifically, when the control circuit 3 reads and decodes a bar code or any other one-dimensional code, the readable data may be limited to only a limited part "abcdefg" serving as a beginning part of the code pattern even when the control circuit 3 performs the decoding operation based on only the pixel signals in the unit image region C1. However, in such a case, the control circuit 3 searches pixel signals representing dark points outside the image region C1 in the vicinity of the region where the reading has not been accomplished (i.e. performs the search in the up-and-down direction of the drawing). As a result of this search, the control circuit 3 confirms the presence of dark points existing in the upper side of the drawing (i.e. the upper side in the vertical direction).

Figure 8C:
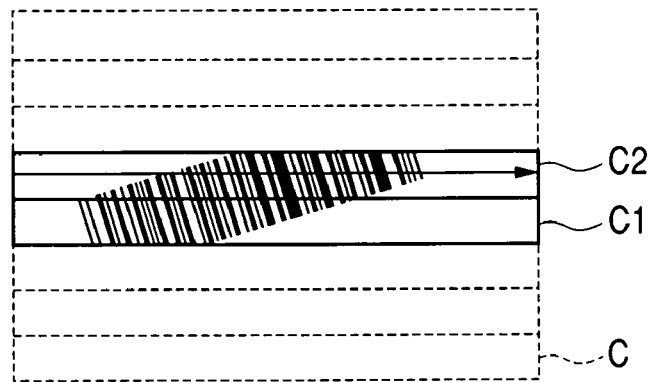

Accordingly, the control circuit 3 sets an image region C2 that is located adjacently at an upper side of the image region C1 to again capture pixel signals from the optical sensor 10 (refer to FIG. 8C). In this case, the control circuit 3 captures the pixel signals in an extended image region. However, it is not always necessary to capture the pixel signals in the image region C2 positioned next to the image region C1. For example, it is possible to jump a predetermined image region to set an image region to be captured additionally.

Then, the control circuit 3 captures the pixel signals in the image region C2 and performs the reading and decoding operations. As a result, it becomes possible to read and decode the data of, for example, "defghijk" serving as an ending part of the code pattern. The control circuit 3 repeats this processing until an end code pattern showing the end of one-dimensional code (i.e. a stop code in the case of a PDF-417). The control circuit 3 checks "abcdefg" and "defghijk" being read through these reading operations, and composes the data to finally obtain all data of "abcdefghijk."

Figure 8D:
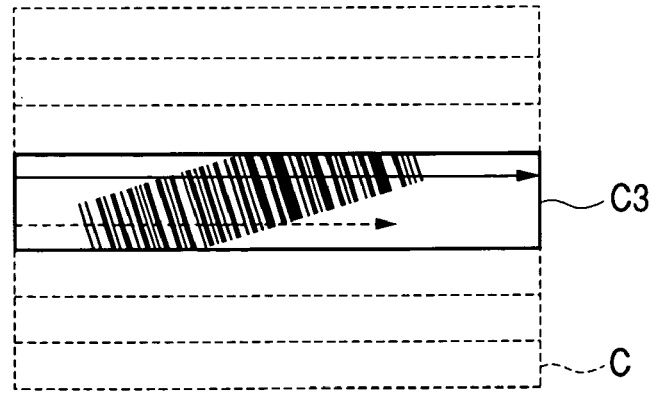

According to the above-described explanation, the control circuit 3 captures the data in the image region C1 as an initial (or previous) reading operation and then captures the pixel signals in the image region C2 positioned adjacently at the upper side of the image region C1. However, instead of capturing the pixel signals in the image region C2, it is possible to capture pixel signals in an image region C3 that partly overlaps with the previously captured image region C1 as shown in FIG. 8D. More specifically, it is possible to capture the pixel signals in a composite region combining the image regions C1 and C2. In this case, the amount of pixel signals to be captured is large and accordingly the required time is long compared with those in the previous explanation. However, there is a significant elapse of time between the previous capturing of pixel signals in the image region C1 and the present capturing of pixel signals in the image region C3. Therefore, there is the possibility that a user may fail to correctly adjust a reading aperture (not shown) of the reading apparatus unit 1 to the one-dimensional code 'B' due to some reasons. Even in such a case, the pixel signals in the presently captured image region C3 include the pixel signals involved in the previously captured image region C1. In other words, this enables the reading apparatus to perform the reading and decoding operations again for the pixel signals contained in the image region C1. Thus, not only the reading and decode operations can be accomplished quickly but also reading errors can be reduced as much as possible.

Figure 9A:
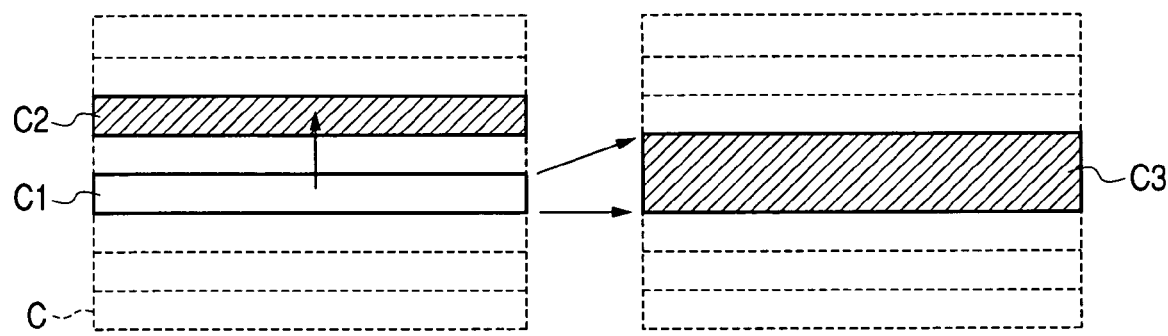
FIGS. 9A to 9C are diagrams schematically showing the change of a capturing objective area in accordance with the fifth embodiment of the present invention.

FIG. 9A shows examples of change occurring in the image region to be captured by the control circuit 3. Namely, as shown in FIG. 9A, the capturing operation is feasible by changing the capturing objective area to a predetermined position (e.g. C1→C2) or by expanding it as described above (e.g. C1→C3) according to predetermined conditions.

In the Case of Two-dimensional Code

Figure 9B:
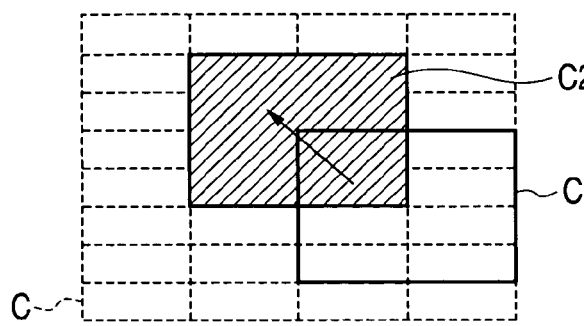
Figure 9C:
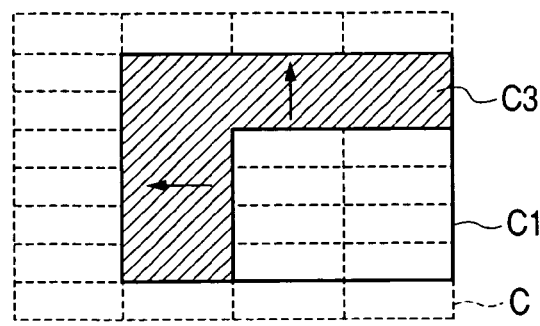

Hereinafter, an example of the information code 'B' arranged by a QR code or any other two-dimensional code will be explained with reference to FIGS. 9A–9C through 11A–11B. The two-dimensional code differs from the one-dimensional code in the reading and decoding processing method. The setting of a unit capturing objective area C for a two-dimensional code is different from the one for a one-dimensional code having been previously described. When the operating section 5 generates a reading instruction of a two-dimensional code, the control circuit 3 initially sets a plurality of dissected square or rectangular regions as unit capturing objective areas C because the code is usually arranged in a rectangular shape, for example, in the case of a QR code. Each of FIGS. 9B and 9C shows such an example. More specifically, each unit image region C has the size of several tens of pixels in both vertical and horizontal directions. One image region consists of numerous dissected image regions C being assembled in the vertical and lateral directions. This arrangement is advantageous in capturing pixel signals containing a rectangular two-dimensional code.

Figure 11A:
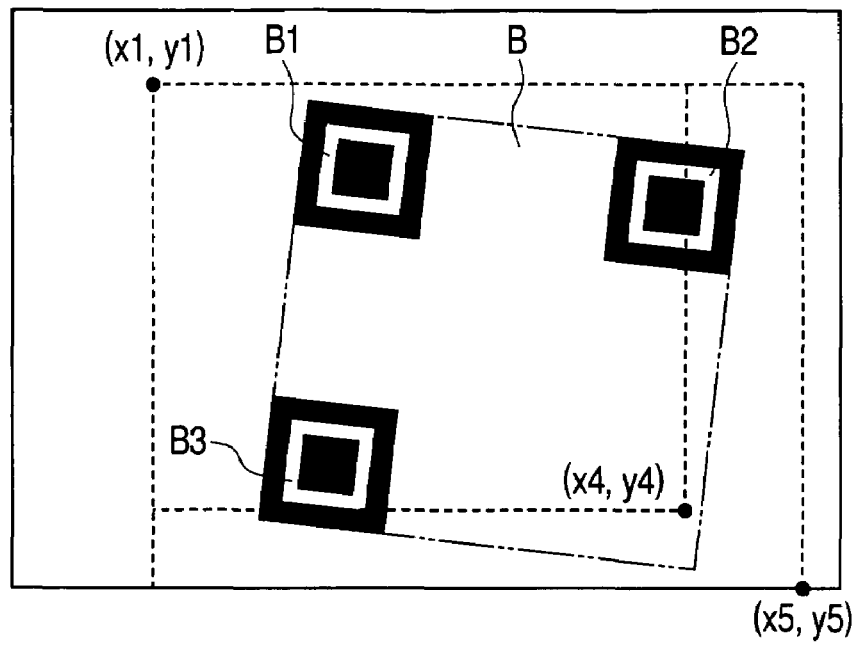
FIGS. 11A and 11B are views schematically showing the change of a capturing objective area in accordance with the fifth embodiment of the present invention.

However, like the explanation given for the reading operation of a one-dimensional code, there is the possibility that the control circuit 3 may capture an inclined image depending on a practical image picking-up method adopted by a user for the optical information reading apparatus unit 1 for imaging a two-dimensional code under the partial capturing mode. The captured image is in an inclined condition relative to horizontal and vertical directions along which the pixels of optical sensor 10 are arrayed. In this case, all of the cells representing the vertices of a two-dimensional code 'B' (refer to OPQR shown in FIG. 11B) may not be completely involved in a capturing objective area with vertices (x1, y1) and (x4, y4) being assumed to be positioned at a central region as shown in FIG. 11A. In this case, the control circuit 3 performs the reading and decoding operations based on the captured pixel signals. However, especially in the case of a QR code 'B', segmented symbols B1 to B3 cooperatively serve as a positioning pattern of the QR code 'B'. If respective positions of the segmented symbol B1 to B3 are not detected, it will be impossible to accurately perform the reading and decoding operations of the QR code 'B'.

Accordingly, when the control circuit 3 judges that decoding this QR code is unfeasible, the control circuit 3 expands the image region for capturing pixel signals at a predetermined ratio (e.g. approximately 10 to 30%) from the rectangular region with vertices (x1, y1) and (x4, y4) to a larger rectangular region with vertices (x1, y1) and (x5, y5). Then, the control circuit 3 again captures pixel signals in an expanded capturing objective area, which enables the reading apparatus to completely capture all of the pixel signals including the QR code 'B' and succeed in the decoding operation.

Although it is possible to adjust the capturing image region by expanding it at a predetermined ratio as described above, the following calculation processing is usable for setting an image region for capturing pixel signals.

Figure 11B:
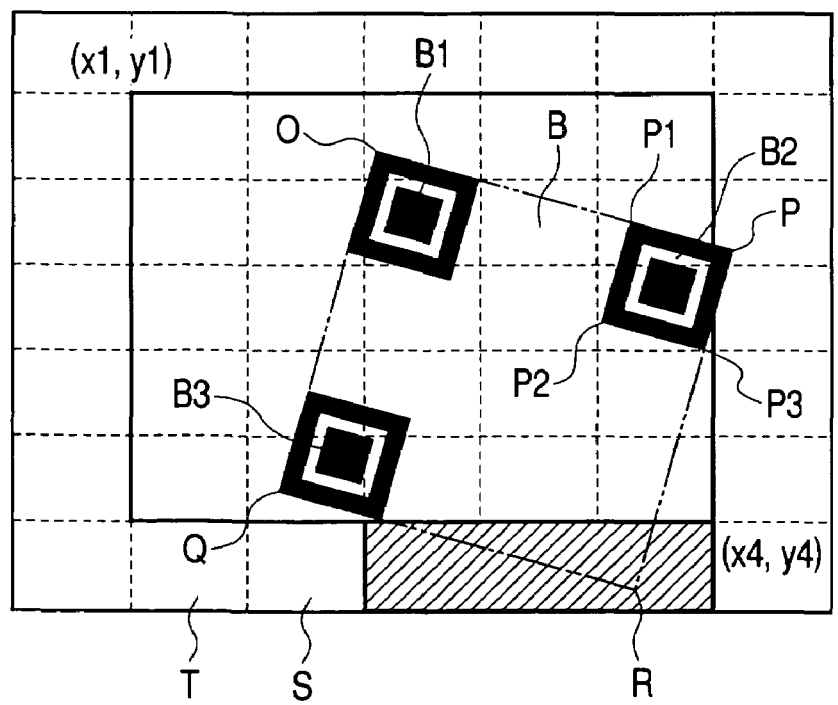

Hereinafter, one example of the calculation processing will be explained. As shown in FIG. 11B, it is now assumed that a QR code 'B' with vertices OPQR is captured in an inclined condition. In the initial condition, under the partial capturing mode the control circuit 3 captures only a central rectangular region with vertices (x1, y1) and (x4, y4) indicated by a solid line so that this capturing objective area includes only two vertices O and Q of four vertices of the QR code 'B'. In this case, a vertex R is outside the capturing objective area being set by the control circuit 3. In other words, the QR code 'B' is not entirely included in the capturing objective area. The control circuit 3, even if it reads this information, cannot recognize the information near the vertex R. Thus, the reading operation is unfeasible.

The control circuit 3, as preprocessing to be performed before the reading operation, calculates vertex positions (e.g. OPQ and P1 to P3 in FIG. 11B) of segmented symbols B1 to B3 (corresponding to a specific pattern) based on captured pixel signals. Calculating these vertex positions makes it possible to determine a region that includes a two-dimensional code in the captured pixel signals.

More specifically, it is now assumed that the control circuit 3 calculates the position of vertex P of a segmented symbol B2 and the position of this symbol B2. First, the control circuit 3 calculates the positions of three vertices P1, P2, and P3 of four vertices of this segmented symbol B2 based on the brightness level of each captured pixel signal. Then, the control circuit 3 assumes the position of the remaining vertex P and as a result assumes the position where the segmented symbol B2 is present. In this case, the control circuit 3 can capture pixel signals again in a unit image region corresponding to the position of vertex P. However, such a capturing operation can be omitted when the control circuit 3 can assume the position where the segmented symbol B2 is present as described above because the segmented symbol B2 has a predetermined shape. Furthermore, the control circuit 3 assumes the positions where other segmented symbols B1 and B3 are present. In this case, when the control circuit 3 can calculate three vertices OPQ in respective segmented symbols B1 to B3, the control circuit 3 can calculate the position of the remaining edge point R based on three calculated vertex positions.

The control circuit 3 may fail in the decode processing (reading processing) of the information code 'B' when the edge point R is not included in the captured pixel signals as shown in FIG. 11B. In this case, as described previously, the control circuit 3 calculates the position of vertex R, which enables the control circuit 3 to assume the position and contour of the information code 'B'. Therefore, the control circuit 3 adjusts the setting of a rectangular capturing image region so as to include only the image region including the vertex R (i.e. a hatched portion in FIG. 11B) or include additional unit image regions S and T. The control circuit 3 again captures pixel signals in a new capturing objective area corresponding to the image region being thus adjusted, so that the control circuit 3 can decode the information code 'B'. FIGS. 9B and 9C show examples of the change occurring in the capturing objective area, respectively (C1→C2, C1→C3). Namely, the capturing objective area can be shifted according to predetermined conditions (e.g. C1→C2 as shown in FIG. 9B) or can be enlarged or reduced according to predetermined conditions (e.g. C1→C3 as shown in FIG. 9C).

Figure 10A:
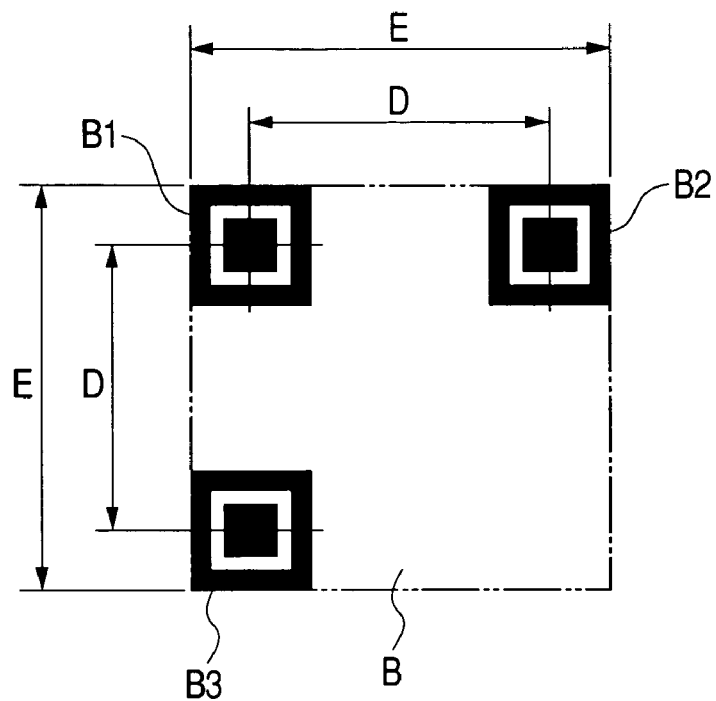
FIGS. 10A and 10B are views each showing a positioning pattern of a two-dimensional code used in the fifth embodiment of the present invention.
Figure 10B:
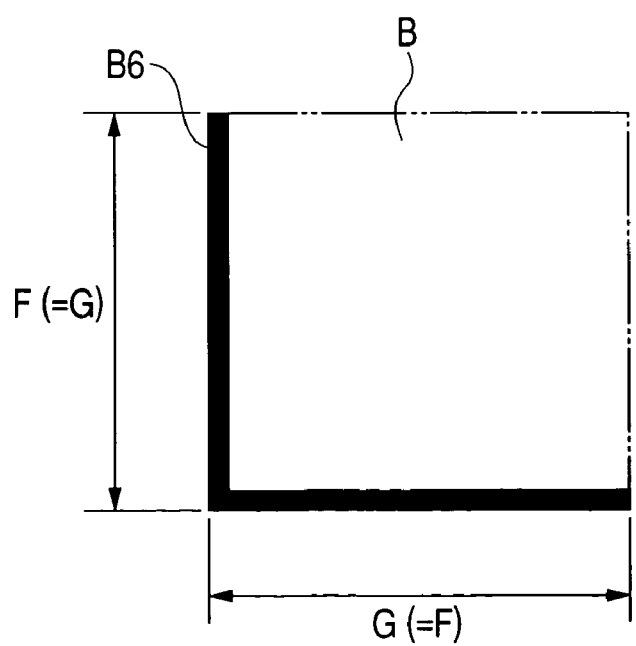

Besides the QR code, this invention is applicable to a code having an L-shaped positioning pattern as shown in FIG. 10B. In the case of a QR code 'B' shown in FIG. 10A, the control circuit 3 can assume the contour size of this QR code 'B' when the control circuit 3 can recognize a distance D between centers of respective segmented symbols and a distance E between distal edges of respective segmented symbols. Furthermore, in the case of an information code 'B' shown in FIG. 10B, the control circuit 3 can assume the contour size of this information code when the control circuit 3 can recognize a distance F between distal edges of respective segmented symbols. Accordingly, the present invention can be applied to not only the QR code but also any other two-dimensional code.

Furthermore, the optical information reading apparatus unit 1 may have the capability of reading a plurality of different kinds of information codes B including the above-described QR code and other two-dimensional codes as well as a bar code and other one-dimensional codes. In this case, the optical information reading apparatus unit 1 can automatically set the reading priority order in reading these information codes B as part of its internal processing.

Hereinafter, an embodiment of the optical information reading apparatus is given to realize the reading operation based on such priority order. When the control circuit 3 captures pixel signals including a one-dimensional code and performs the reading and decoding operations, it is preferable to read a central one of thin dissected image regions extending in the horizontal direction (i.e. lateral direction) in succeeding the reading operation. When the control circuit 3 captures pixel signals including a two-dimensional code and performs the reading operation, it is preferable to read a central one of rectangular dissected image regions in succeeding the reading operation. Accordingly, it is preferable that image regions to be captured by the control circuit 3 under the partial capturing mode are determined beforehand by the control circuit 3 so as to correspond to these plurality of different kinds of information codes. More specifically, the image capturing region should be set at a central region in the case of a QR code or other two-dimensional code, and should be set at a central laterally extending thin region in the case of a bar code or other one-dimensional code. Such settings enable the information reading apparatus to quickly and effectively accomplish the reading operation.

Furthermore, a user may use this optical information reading apparatus unit 1 for limited purposes. In such a case, two-dimensional codes or one-dimensional codes used frequently by the user will be limited to particular types. Accordingly, it is preferable to assign the priority order to each of plural kinds of information codes. More specifically, a memory (i.e. memory means) associated with the control circuit 3 has a memory region dedicated for memorizing such priority orders. The control circuit 3 judges the type of each code upon accomplishing the reading operation for a two-dimensional code or a one-dimensional code. The control circuit 3 stores the priority order into the memory in accordance with the judgment result. In this case, if the control circuit 3 has succeeded in reading a QR code among plural kinds of information codes B, the control circuit 3 assigns the first priority order to this QR code. Accordingly, the control circuit 3 regards an information code 'B' as a QR code when such a code is contained in pixel signals captured in the next reading operation. Therefore, if this QR code is the information code 'B' being frequently used by a user, it becomes possible to quickly accomplish the reading operation. The time required for reading and decoding operations can be shortened. Although this embodiment is based on a QR code, this embodiment will bring the same effect even when this embodiment uses a bar code.

According to this embodiment, under the partial capturing mode, even when the control circuit 3 fails to capture pixel signals containing an information code 'B', the control circuit 3 can adjust the image region so as to include the contour of this information code 'B' to again capture pixel signals in a new image region having been thus adjusted. Therefore, it becomes possible to shorten the time required for reading and decoding operations.

Sixth Embodiment

Figure 12A:
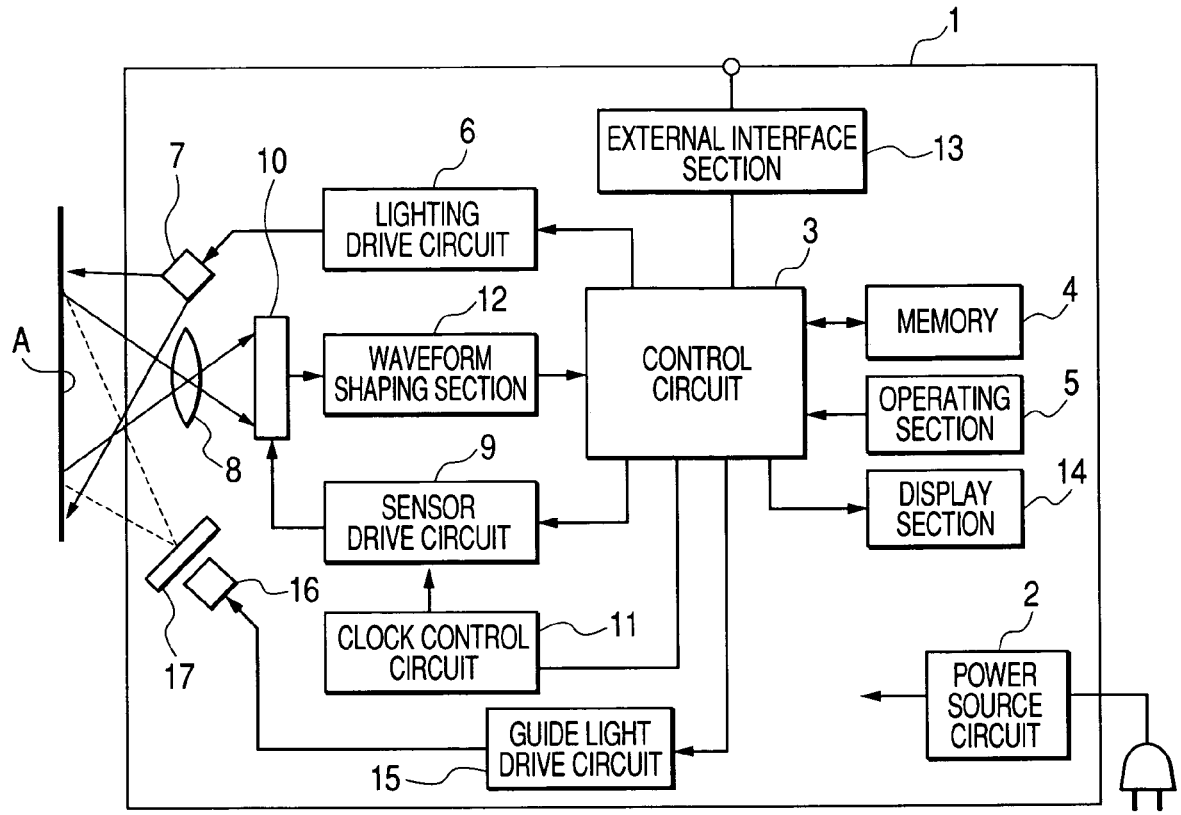
FIG. 12A is a circuit diagram corresponding to FIG. 1 but showing an electric arrangement of an optical information reading apparatus in accordance with a sixth embodiment of the present invention.
Figure 12B:
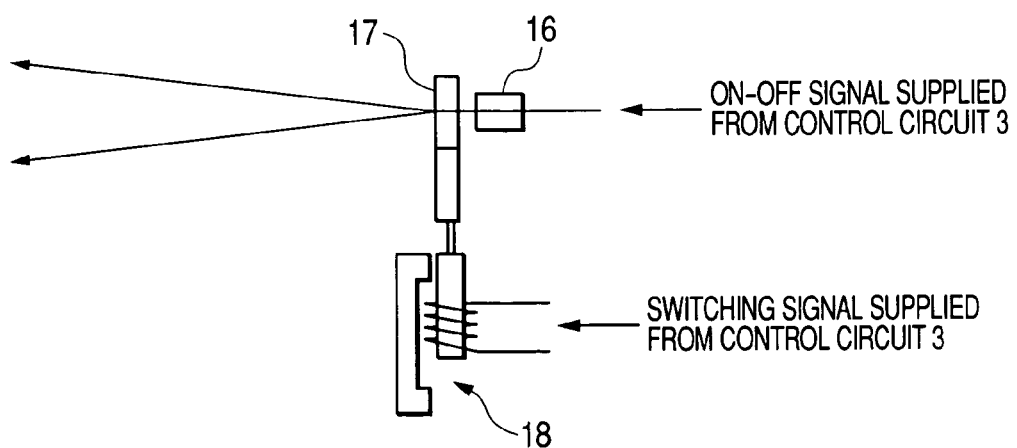
FIG. 12B is an enlarged diagram showing an arrangement for changing an irradiating area of a guide light in accordance with the sixth embodiment of the present invention.
Figure 15:
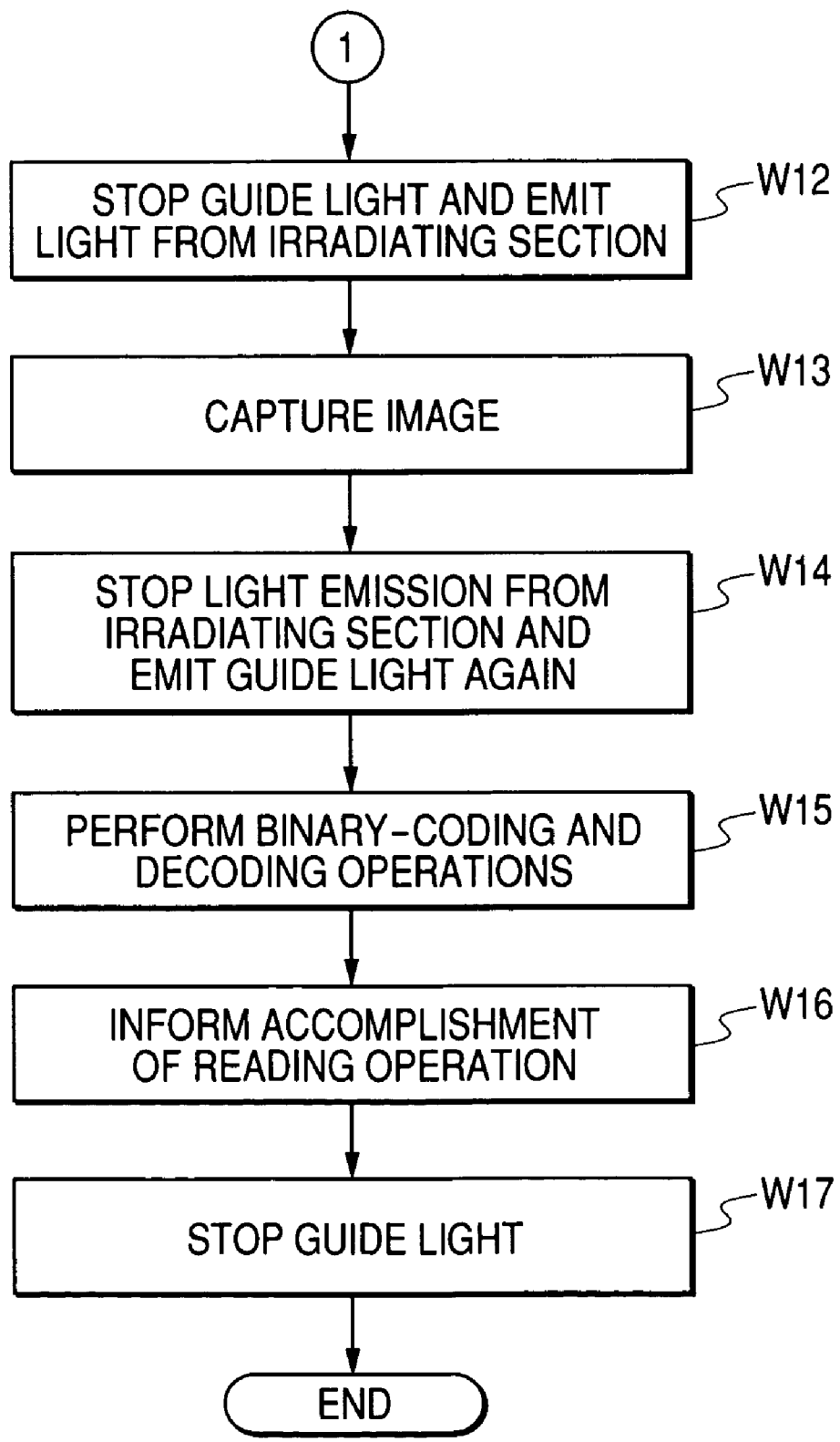
FIG. 15 is a flow flowchart (part II) explaining the guide light irradiating operation as well as reading and decoding operations performed by the optical information reading apparatus in accordance with the sixth embodiment of the present invention.

FIGS. 12A–12B through 15 are given for explaining a sixth embodiment of the present invention that is different from the previously explained embodiments in using a guide light. The portion identical with that in the previously described embodiment is denoted by the same reference numeral and will not be explained.

FIG. 12A is a circuit diagram schematically showing an electric arrangement.

The control circuit 3 is connected via a guide light drive circuit 15 to a laser source 16 (corresponds to guide light emitting means). The laser source 16 functioning as the guide light emitting means is, for example, arranged by a laser diode. The laser source 16 emits a laser beam via an optical member 17 toward a reading objective 'A' under the control of the control circuit 3. FIG. 12B schematically shows a mechanical and optical example of the laser source and the optical member. The optical member 17 is connected to an optical member switcher 18. The optical member 17 is, for example, arranged by a hologram. The optical member 17 has plural kinds of irradiation patterns for the guide light to be emitted toward the reading objective 'A'. In this embodiment, the control circuit 3 functions as guide position detecting means for detecting the position of a guide light.

Figure 13A:
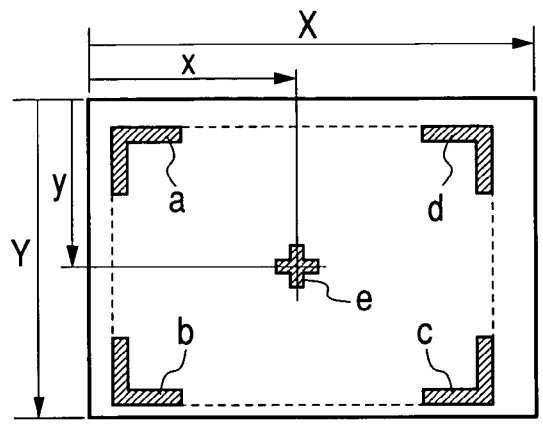
FIGS. 13A to 13D are diagrams showing irradiation patterns of the guide light and FIGS. 13E and 13F are diagrams showing images obtained when a user adjusts the guide light on an information code in accordance with the sixth embodiment of the present invention.
Figure 13B:
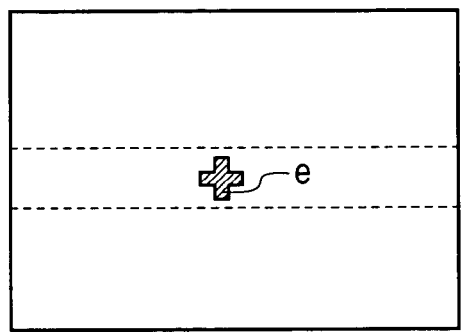
Figure 13C:
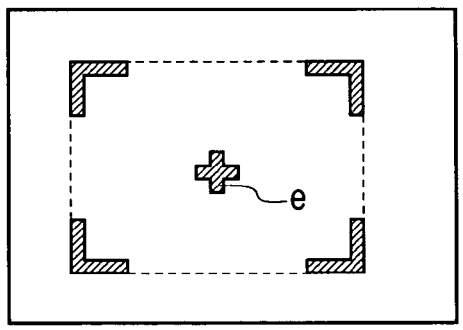
Figure 13D:
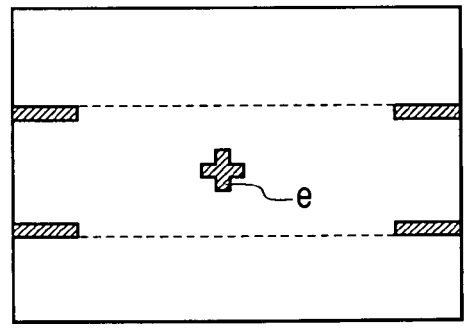
Figure 13E:
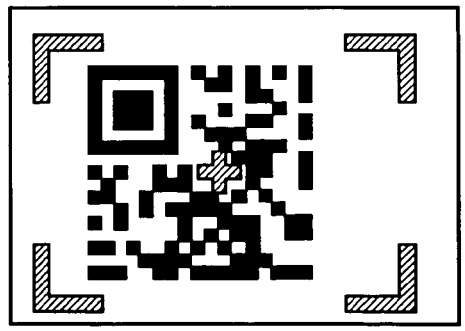
Figure 13F:
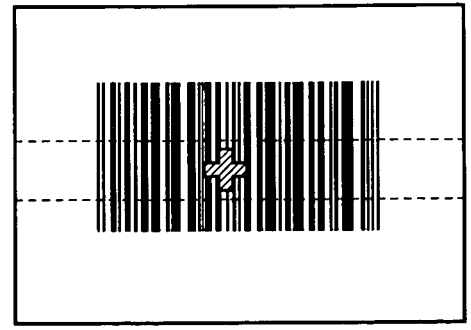

The optical member switcher 18 connected to the optical member 17 has the capability of, for example, electromagnetically switching the irradiation pattern of a guide light based on a switching signal supplied from the control circuit 3. It is possible to prepare dual guide light systems and on-and-off switch their guide light sources. As one example, the irradiation pattern of a guide light can be switched as shown in FIGS. 13A to 13D when the guide light is emitted toward the reading objective 'A'. Hereinafter, this will be explained in more detail. In the irradiation patterns shown in FIGS. 13A to 13D, each region defined by a dotted line represents a capturing objective area in one image region to be set under the partial capturing mode. Although not shown as an image irradiated on the reading objective 'A', this capturing objective area is shown for the purpose of easing the understanding of the explanation. The region encircled by a dotted line in FIGS. 13A and 13C is a capturing objective area for a two-dimensional code. The region encircled by a dotted line in FIGS. 13B and 13D is a capturing objective area for a one-dimensional code. The capturing image region shown in FIG. 13A is large compared with the capturing image region shown in FIG. 13C. Changing the irradiation pattern enables the information reading apparatus to emit the guide light toward the reading objective 'A' in various ways. Especially, switching the irradiation pattern in plural levels makes it possible to improve the general-purpose properties of the information reading apparatus and is preferable especially when the information reading apparatus reads different types of information codes as shown in FIGS. 13A–13F.

The irradiation pattern of a guide light can be changed in various ways as shown in FIGS. 13A–13F. When the irradiation pattern of a guide light is for only showing the central position of one image region as shown in FIG. 13B, it is preferable that the image region of pixel signals to be captured by the control circuit 3 is smaller than an image region shown in FIG. 13D. In this case, the capturing image region during the reading operation becomes narrow. Therefore, the time required for the reading operation becomes short compared with the case of capturing the pixel signals from the image region shown in FIG. 13D.

Furthermore, as shown in FIGS. 13A, 13C, and 13D, it is preferable that the laser source 16 emits a laser beam as a guide light in such a manner that a contour of the capturing objective area is additionally shown on a reading objective 'A'. The contour of the capturing objective area indicates a region where the control circuit 3 captures pixel signals. According to this irradiation pattern, users can easily recognize the central position of a capturing image region to be captured by the optical information reading apparatus unit 1. This enables users to easily adjust an aiming direction toward a two-dimensional code or a one-dimensional code. It becomes possible to increase the probability of success when the control circuit 3 captures pixel signals from this capturing objective area and performs reading and decoding operations (refer to FIG. 13E and FIG. 13F).

Figure 14:
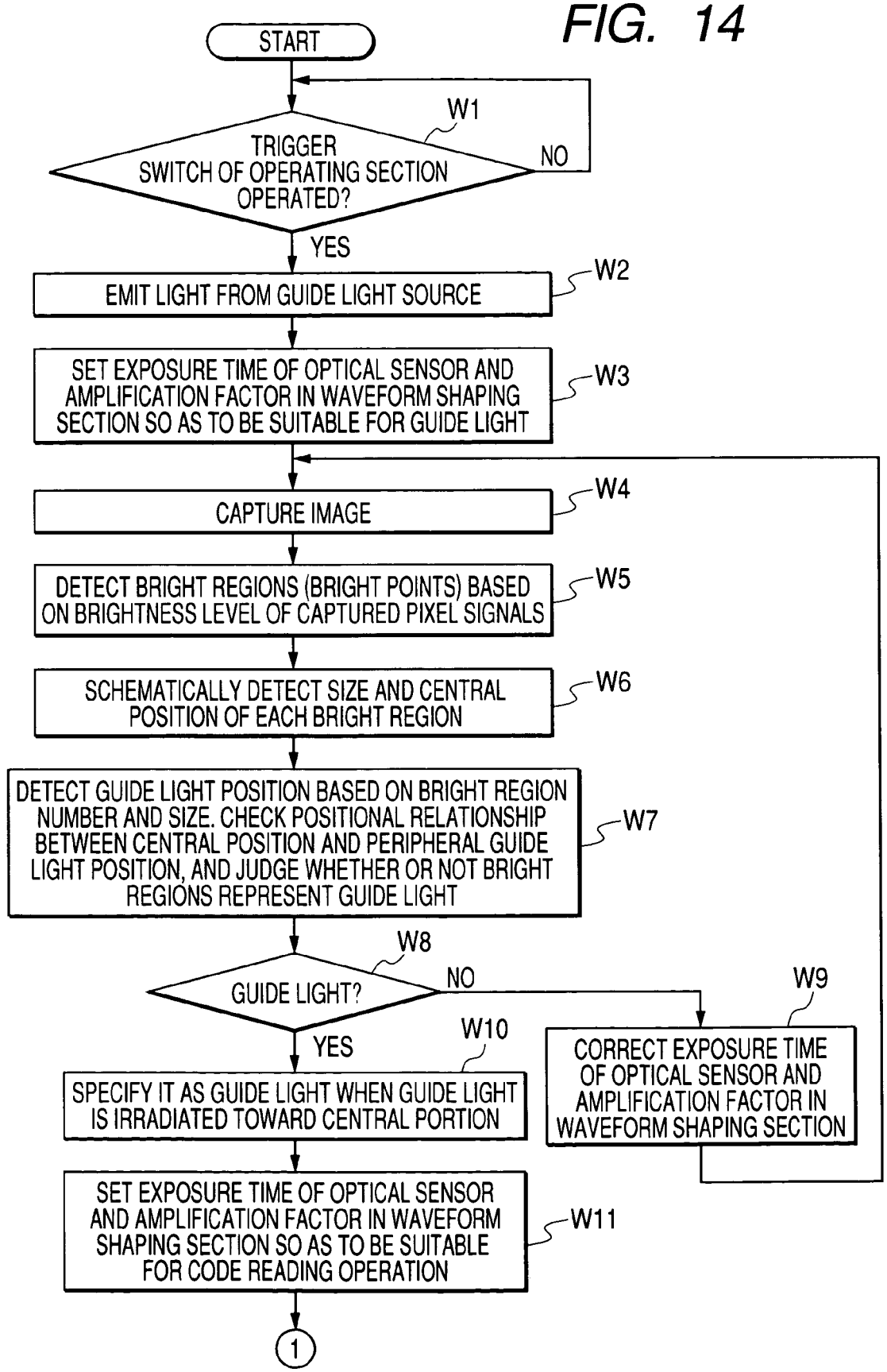
FIG. 14 is a flow flowchart (part I) explaining a guide light irradiating operation as well as reading and decoding operations performed by the optical information reading apparatus in accordance with the sixth embodiment of the present invention.

Next, practical reading and related operations performed by the control circuit 3 or the like will be explained with reference to FIGS. 14 and 15.

When a user operates a trigger switch of the operating section 5 to instruct a reading operation (YES in step W1), the control circuit 3 causes the laser source 16 serving as a guide light source to emit a laser beam toward a reading objective 'A' (refer to step W2). In the case of a handy-type optical information reading apparatus, it is necessary to suppress electric power consumption and accordingly it is preferable to shorten the time required for emitting the guide light. Therefore, it is desirable that the laser source 16 emits the guide light in response to each reading instruction entered from the operating section 5. On the other hand, when the optical information reading apparatus unit 1 can receive electric power from an external power source, it is preferable that the order of executing the above-described steps W1 and W2 is reversed in view of improving performances. In other words, if a user operates the trigger switch of the operating section 5 under a condition that the laser source 16 emits the guide light to indicate a capturing objective area on the reading objective 'A', it will be preferable to start the following processing.

Hereinafter, to detect the position of the guide light, the control circuit 3 executes the following processing. More specifically, the control circuit 3 sets an exposure time of the optical sensor 10 and an amplification factor of an amplifying circuit incorporated in the waveform shaping section 12 so as to be suitable for the guide light (refer to step W3). Then, the control circuit 3 captures the image of a predetermined capturing objective area (refer to step W4). The control circuit 3 calculates the brightness level of each captured pixel signal and detects a bright point (i.e. bright region) based on the calculated brightness level (refer to step W5). The control circuit 3, in this case, schematically detects the size and the central position of each bright region (refer to step W6). The control circuit 3 detects the position of the guide light based on the number and size of bright regions and checks the positional relationship between the central position (i.e. a central position indicated by a reference sign 'e' in FIGS. 13A–13D) and the peripheral guide light (i.e. portions indicated by reference signs 'a' to 'd' in FIG. 13A). The control circuit 3 judges whether or not the bright regions (portions indicated by reference signs 'a' to 'e' in FIGS. 13A–13D) represent the guide light (refer to step W7). As shown in FIGS. 13A–13D, the control circuit 3 captures pixel signals via the optical sensor 10 so as to include the position of the guide light emitted on the reading objective 'A'. Therefore, the control circuit 3 can detect the position of the guide light.

When the control circuit 3 judges in the step W7 that the bright regions do not represent the guide light (i.e. NO in step W8), the control circuit 3 corrects the exposure time of the optical sensor 10 and the amplification factor of the amplifying circuit in the waveform shaping section 12. The control circuit 3 repeats the processing of step W4 and succeeding steps. On the other hand, when the control circuit 3 judges that the bright regions represent the guide light (i.e. YES in step W8), the control circuit 3 identifies the position of the central guide light considering the relationship to the irradiated position of the guide light in the case that the irradiation pattern includes a central guide light (refer to the portion 'e' in FIGS. 13A to 13D). Then, the control circuit 3 stores the identified position in the memory.

Then, the control circuit 3 sets the exposure time of the optical sensor 10 and the amplification factor of the amplifying circuit constituting the waveform shaping section 12 so as to be suitable for a code reading operation (refer to step W11). In general, the exposure conditions suitable for emitting a guide light to capture an image are different from the exposure conditions suitable for reading an information code 'B'. This is why the exposure time and the amplification factor must be adjusted again.

Thereafter, the control circuit 3 causes the laser source 16 to stop emitting the guide light. Then, the control circuit 3 causes the irradiating section 7 to emit light to capture an image (refer to steps W12 and W13). Then, the control circuit 3 causes the irradiating section 7 to stop emitting the light, and causes the laser source 16 to emit a laser beam (refer to step W14). Then, the control circuit 3 processes a captured pixel signal into a binary-coded data and performs the decoding (i.e. reading and decoding) processing (refer to step W15). Then, the control circuit 3 activates a buzzer or turns on an LED to notify the outside of accomplishment of the reading operation (refer to step W16). Then, the control circuit 3 causes the laser source 16 to stop emitting the guide light (refer to step W17) and terminates this routine.

According to this embodiment, the control circuit 3 causes the laser source 16 to emit the guide light toward the reading objective 'A' in such a manner that a user can recognize a capturing region of one image region being imaged by the optical sensor 10. The control circuit 3 detects the position of the guide light, and captures pixel signals through the optical sensor 10 based on the detected positions. Then, the control circuit 3 performs the reading and decoding operations. Therefore, convenience for the users can be improved. The time required for reading and decoding operations can be shortened.

Seventh Embodiment

Figure 16:
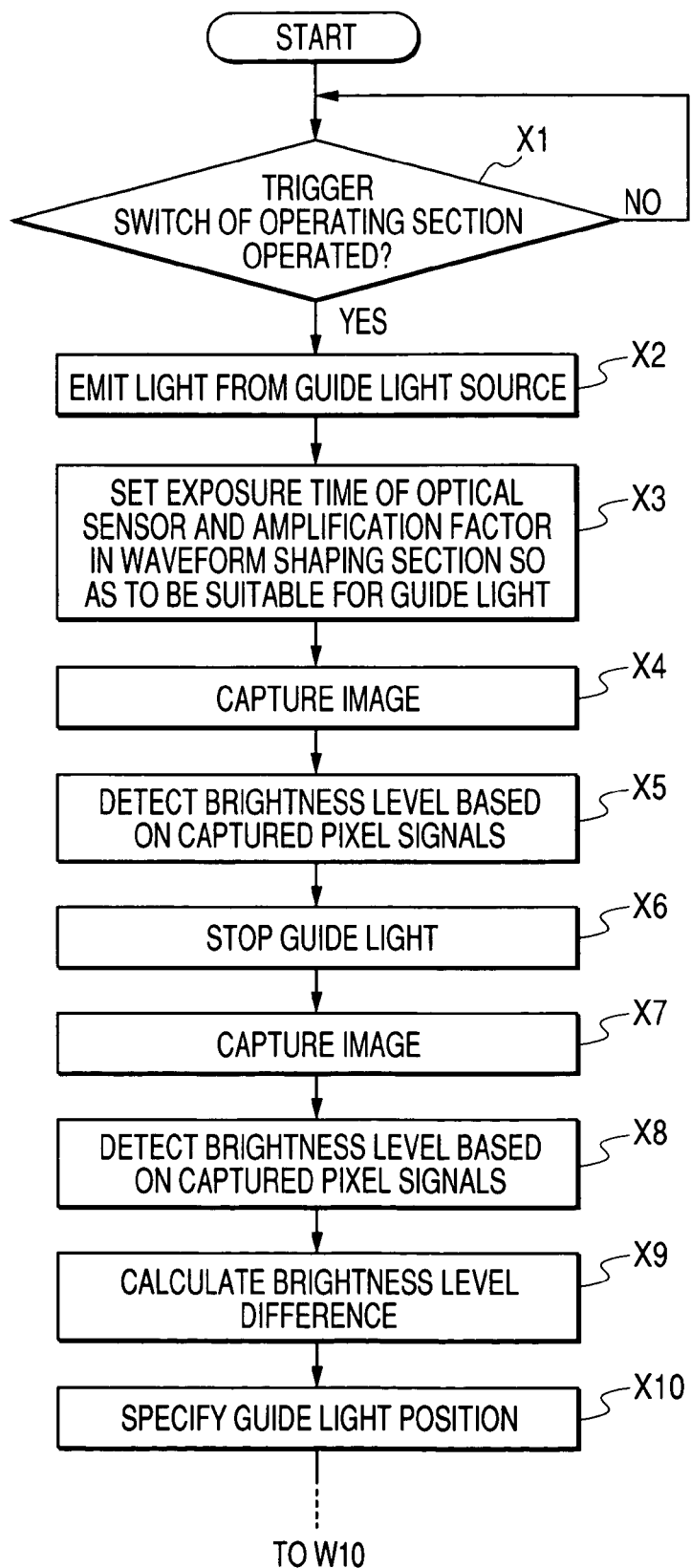
FIG. 16 is a flowchart corresponding to part of FIG. 14 but showing an operation of an optical information reading apparatus in accordance with a seventh embodiment of the present invention.

FIG. 16 is given for explaining a seventh embodiment of the present invention that is different from the sixth embodiment in the processing for specifying the position of a guide light. More specifically, instead of performing the processing of steps W1 to W9 explained in the previous embodiment, the seventh embodiment performs the processing of steps X1 to X10 shown in FIG. 16 so as to modify the processing for specifying the position of the guide light, which will be explained in more detail hereinafter.

More specifically, the control circuit 3 serving as specifying means causes the laser source 16 to emit a laser beam when a user operates a trigger switch of the operating section 5 and sets the exposure conditions so as to be suitable for the guide light and then captures one image (refer to steps X1 to X4). Thereafter, the control circuit 3 detects the brightness level based on the captured pixel signals (refer to step X5), and causes the laser source 16 to stop emitting the guide light (refer to step X6). Next, the control circuit 3 again performs the capturing of an image based on an image region being captured in the step X4 (refer to step X7). Then, the control circuit 3 detects the brightness level of each captured pixel signal (refer to step X8). Thereafter, the control circuit 3 calculates a difference between the brightness level detected in the step X5 and the brightness level detected in the step X8 (refer to step X9), which enables the control circuit 3 to specify the position of the guide light (refer to step X10).

Namely, when the control circuit 3 captures pixel signals under a condition that the guide light is irradiated and also after the irradiation of the guide light is stopped, the control circuit 3 specifies the correspondence between the position of the guide light being set in one image region captured under irradiation of the guide light and a corresponding position in one image region captured after stopping the irradiation of the guide light. This enables the control circuit 3 to specify the position of the guide light. Thus, this embodiment can bring the same functions and effects as those of the previously described sixth embodiment.

Other Embodiment

The present invention is not limited to the above-described embodiments and therefore can be modified or extensible, for example, as shown in the following description.

According to the above-described embodiment, the control circuit 3 lo changes the operating frequency of the optical sensor 10 to change the operating condition. However, the present invention is not limited to such an arrangement. For example, there is a case that the optical sensor 10, as its independent function, has the capability of selecting a high-speed capturing mode for capturing pixel signals in a thinning-out fashion or a partial capturing mode for capturing a limited portion of the pixel signals. In such a case, it will be possible for the control circuit 3 to give a function switching signal to the optical sensor 10 to enable the optical sensor 10 to selectively perform the thinning-out capturing operation or the partial capturing operation in capturing the pixel signals.

It is needless to say that the present invention is applicable to the optical sensor 10 having the resolution of 640 pixels× 480 pixels in total pixel number. Furthermore, the present invention is applicable to an optical sensor having the resolution of 802 pixels×602 pixels.

What is claimed is:

1. An optical information reading apparatus comprising: an optical sensor for picking up an image and reading means for optically reading an information code contained in pixel signals of an image region that is picked up by said optical sensor, comprising: switching means for selecting one of a plurality of capturing modes in accordance with predetermined conditions being set in a reading apparatus unit, said plurality of capturing modes including at least an ordinary capturing mode and a reduced-number capturing mode being registered beforehand in said reading apparatus unit, wherein said ordinary capturing mode is for capturing all of pixel signals contained in one image region being imaged by said optical sensor and said reduced-number capturing mode is for capturing a reduced number of pixel signals in said one image region compared with the pixel signals captured when said ordinary capturing mode is selected;

capturing means for capturing the pixel signals in said one image region being imaged by said optical sensor according to said capturing mode being selected by said switching means;

guide light emitting means for emitting a guide light toward a reading objective so that a user can recognize a substantial central position of said one image region being imaged by said optical sensor; and guide position detecting means for detecting the position of said guide light in said one image region when said guide light is emitted toward said reading objective, wherein said capturing means captures pixel signals from said optical sensor based on the position of said guide light being detected by said guide position detecting means.

2. The optical information reading apparatus in accordance with claim 1, wherein said predetermined conditions being set in said reading apparatus unit include a type of the information code, and said switching means selects one of said plurality of capturing modes in accordance with said predetermined conditions including said type of the information code.

3. The optical information reading apparatus in accordance with claim 1, wherein said reading means performs an optical reading operation when a minimum number of dark point pixels contained in pixel signals of said one image region captured by said capturing means is larger than a predetermined value under a condition that said switching means selects said reduced-number capturing mode.

4. The optical information reading apparatus in accordance with claim 1, wherein said capturing means preliminarily captures pixel signals of one image region for setting reading conditions of the information code under a condition that said reduced-number capturing mode is selected by said switching means.

5. The optical information reading apparatus in accordance with claim 1, wherein said reduced-number capturing mode includes a high-speed capturing mode for capturing pixel signals of said one image region being imaged by said optical sensor by thinning some pixel signals out every predetermined number of scanning lines.

6. The optical information reading apparatus in accordance with claim 1, wherein said reduced-number capturing mode includes a partial capturing mode for capturing part of pixel signals of said one image region.

7. The optical information reading apparatus in accordance with claim 1, further comprising assuming means for assuming a position where the information code is present and a contour of said information code based on pixel signals in said one image region captured by said capturing means, wherein said capturing means performs a capturing operation again, when said reading means cannot optically read the information code within the contour of the information code assumed by said assuming means, by using a contour expanded from the assumed contour of the information code in the vicinity of the position assumed by said assuming means.

8. The optical information reading apparatus in accordance with claim 1, wherein said capturing means captures the pixel signals during said reduced-number capturing mode by causing driving means to drive said optical sensor at an operating frequency higher than an operating frequency used for driving said optical sensor to capture the pixel signals of said one image region during said ordinary capturing mode.

9. The optical information reading apparatus in accordance with claim 1, wherein said capturing means adjusts a thinning-out rate in a thinning-out operation for capturing the pixel signals of said one image region being imaged by said optical sensor.

10. The optical information reading apparatus in accordance with claim 1, further comprising assuming means for assuming a position where the information code is present and a contour of said information code based on pixel signals in said one image region captured by said capturing means, wherein when said reading means cannot optically read the information code based on pixel signals of the image region captured by said capturing means during the reduced-number capturing mode, said capturing means newly sets an image region that can include the information code having said assumed contour based on said position and said contour of said information code that are assumed by said assuming means, and said capturing means again captures pixel signals within said image region being newly set as a capturing objective area.

11. The optical information reading apparatus in accordance with claim 1, wherein when said capturing means captures pixel signals of an image region having a predetermined size during said reduced-number capturing mode and when said reading means cannot accomplish an optical reading operation for said information code based on the pixel signals of said captured image region, said capturing means detects the positions of dark point pixels existing along an outer periphery of the captured image region and additionally captures pixel signals of an image region existing outside said detected position.

12. The optical information reading apparatus in accordance with claim 1, wherein said information code is a two-dimensional code, and said optical information reading apparatus includes calculating means for calculating vertex positions of a specific pattern defining a region of said two-dimensional code based on the pixel signals of said one image region captured by said capturing means, and said assuming means assumes the position where said information code is present and a contour of said information code based on the pixel signals of said one image region captured by said capturing means as well as the vertex positions calculated by said calculating means.

13. The optical information reading apparatus in accordance with claim 1, wherein said capturing means captures the pixel signals under a condition that at least either the position of an image region to be captured by said optical sensor or the size of the image region to be captured by said optical sensor is determined beforehand.

14. The optical information reading apparatus in accordance with claim 1, wherein said capturing means captures the pixel signals from said optical sensor so as to include the position of the guide light detected by said guide position detecting means.

15. The optical information reading apparatus in accordance with claim 1, further comprising specifying means for specifying the position of said guide light being set in one image region captured during emission of said guide light as being equivalent to a corresponding position in one image region captured after stopping emission of said guide light, in a case that said capturing means captures the pixel signals of said image region during said guide light emitting means emits the guide light toward the reading objective and after said guide light emitting means stops emitting the guide light.

16. The optical information reading apparatus in accordance with claim 1, wherein said guide light emitting means emits the guide light according to an irradiation pattern and said irradiation pattern is switched to one of plural levels.

17. The optical information reading apparatus in accordance with claim 1, wherein said guide light emitting means, under a condition that said switching means selects said reduced-number capturing mode, emits the guide light in such a manner that said guide light points a capturing objective area of the pixel signals to be captured according to said reduced-number capturing mode.

18. The optical information reading apparatus in accordance with claim 1, wherein said one image region is dissected into a plurality of unit image regions and said capturing means captures each unit image region during the reduced-number capturing mode.

19. The optical information reading apparatus in accordance with claim 1, wherein the optical information reading apparatus has the capability of reading a plurality of different kinds of information codes, and an image region for capturing the pixel signals used by said capturing means during the reduced-number capturing mode is determined beforehand so as to correspond to each of said plurality of different kinds of information codes.

20. The optical information reading apparatus in accordance with claim 19, wherein said reading means reads each of said plurality of different kinds of information codes based on a priority order assigned to each information code.

21. The optical information reading apparatus in accordance with claim 19, wherein when said reading means succeeds in reading pixel signals captured by said capturing means as containing one information code among said plurality of different kinds of information codes, said reading means starts a next reading operation by regarding any information code contained in pixel signals captured next time by said capturing means as being identical with said one information code having been successfully read.

22. A method for optically reading an information code contained in pixel signals of an image region being imaged by an optical sensor, comprising the steps of:
  selecting one of a plurality of capturing modes in accordance with predetermined conditions being set in a reading apparatus unit, said plurality of capturing modes including at least an ordinary capturing mode and a reduced-number capturing mode being registered beforehand in said reading apparatus unit, wherein said ordinary capturing mode is for capturing all of pixel signals contained in one image region being imaged by said optical sensor and said reduced-number capturing mode is for capturing a reduced number of pixel signals in said one image region compared with the pixel signals captured when said ordinary capturing mode is selected;
  capturing the pixel signals in said one image region being imaged by said optical sensor according to a selected capturing mode;
  emitting a guide light toward a reading objective so that a user can recognize a substantial central position of said one image region being imaged by said optical sensor; and
  detecting the position of said guide light in said one image region when said guide light is emitted toward said reading objective,
  wherein said step of capturing the pixel signals from said optical sensor is performed based on the detected position of said guide light.

23. The optical information reading method in accordance with claim 22, wherein said predetermined conditions being set in said reading apparatus unit include a type of the information code, and one of said plurality of capturing modes is selected in accordance with said predetermined conditions including the type of the information code.

24. The optical information reading method in accordance with claim 22, wherein an optical reading operation is performed when a minimum number of dark point pixels contained in pixel signals of said one image region is larger than a predetermined value under a condition that said reduced-number capturing mode is selected.

25. The optical information reading method in accordance with claim 22, further comprising a step of preliminarily capturing pixel signals of one image region for setting reading conditions of the information code under a condition that said reduced-number capturing mode is selected.

26. The optical information reading method in accordance with claim 22, wherein said reduced-number capturing mode includes a high-speed capturing mode for capturing pixel signals of said one image region being imaged by said optical sensor by thinning some pixel signals out every predetermined number of scanning lines.

27. The optical information reading method in accordance with claim 22, wherein said reduced-number capturing mode includes a partial capturing mode for capturing part of pixel signals of said one image region.

28. The optical information reading method in accordance with claim 22, further comprising a step of assuming a position where the information code is present and a contour of said information code based on pixel signals in said one image region, wherein a capturing operation is performed again, when the information code cannot be optically read within the assumed contour of the information code, by using a contour expanded from the assumed contour of the information code in the vicinity of the assumed position.

29. The optical information reading method in accordance with claim 22, wherein said optical sensor is driven during said reduced-number capturing mode to capture pixel signals of said one image region at an operating frequency higher than an operating frequency used for driving said optical sensor to capture the pixel signals of said one image region during said ordinary capturing mode.

30. The optical information reading method in accordance with claim 22, further comprising a step of adjusting a thinning-out rate in a thinning-out operation for capturing the pixel signals of said one image region being imaged by said optical sensor.

31. The optical information reading method in accordance with claim 22, further comprising a step of assuming a position where the information code is present and a contour of said information code based on pixel signals in said one image region, wherein when the information code cannot be optically read based on pixel signals of the image region captured during the reduced-number capturing mode, an image region that can include the information code having said assumed contour is newly set based on said position and said contour of said information code that are assumed, and said step of capturing pixel signals is performed again with said image region being newly set as a capturing objective area.

32. The optical information reading method in accordance with claim 22, further comprising a step of detecting the positions of dark point pixels existing along an outer periphery of a captured image region having a predetermined size and additionally capturing pixel signals of an image region existing outside said captured image region, when an optical reading operation for said information code cannot be accomplish based on the pixel signals of said captured image region during said reduced-number capturing mode.

33. The optical information reading method in accordance with claim 22, wherein said information code is a two-dimensional code, and a step of calculating vertex positions of a specific pattern defining a region of said two-dimensional code is performed based on the pixel signals of said one image region, and a step of assuming a position where said information code is present and a contour of said information code is performed based on the pixel signals of said one image region as well as the calculated vertex positions.

34. The optical information reading method in accordance with claim 22, wherein the step of capturing the pixel signals is performed under a condition that at least either the position of an image region to be captured by said optical sensor or the size of the image region to be captured by said optical sensor is determined beforehand.

35. The optical information reading method in accordance with claim 22, wherein said step of capturing the pixel signals from said optical sensor is performed so as to include the detected position of the guide light.

36. The optical information reading method in accordance with claim 22, further comprising a step of specifying a position of said guide light being set in one image region captured during emission of said guide light as being equivalent to a corresponding position in one image region captured after stopping emission of said guide light, in a case that the pixel signals of said image region are captured during emission of said guide light toward the reading objective and after stopping emission of the guide light.

37. The optical information reading method in accordance with claim 22, wherein the guide light is emitted according to an irradiation pattern and said irradiation pattern is switched to one of plural levels.

38. The optical information reading method in accordance with claim 22, wherein under a condition that said reduced-number capturing mode is selected, emission of the guide light is performed in such a manner that said guide light points a capturing objective area of the pixel signals to be captured according to said reduced-number capturing mode.

39. The optical information reading method in accordance with claim 22, further comprising a step of dissecting said one image region into a plurality of unit image regions so that each unit image region can be captured during the reduced-number capturing mode.

40. The optical information reading method in accordance with claim 22, wherein the reading apparatus unit has the capability of reading a plurality of different kinds of information codes, and an image region for capturing the pixel signals used during the reduced-number capturing mode is determined beforehand so as to correspond to each of said plurality of different kinds of information codes.

41. The optical information reading method in accordance with claim 40, wherein each of said plurality of different kinds of information codes is read based on a priority order assigned to each information code.

42. The optical information reading method in accordance with claim 40, wherein when a reading operation based on captured pixel signals results in successfully identifying one information code among said plurality of different kinds of information codes, a next reading operation begins by regarding any information code contained in pixel signals captured next time as being identical with said one information code having been successfully read.

* * * * *